(12) United States Patent
Feistritzer et al.

(10) Patent No.: US 11,267,214 B2
(45) Date of Patent: Mar. 8, 2022

(54) MANUFACTURING A HARD-METAL PRESSED ARTICLE

(71) Applicant: HORN HARTSTOFFE GMBH, Tuebingen (DE)

(72) Inventors: Stefan Feistritzer, Tuebingen (DE); Dieter Hermes, Rottenburg (DE)

(73) Assignee: Horn Hartstoffe GmbH, Tuebingen (DE)

( * ) Notice: Subject to any disclaimer, the term of this patent is extended or adjusted under 35 U.S.C. 154(b) by 165 days.

(21) Appl. No.: 16/381,588

(22) Filed: Apr. 11, 2019

(65) Prior Publication Data

US 2019/0232593 A1 Aug. 1, 2019

Related U.S. Application Data

(63) Continuation of application No. PCT/EP2017/075948, filed on Oct. 11, 2017.

(30) Foreign Application Priority Data

Oct. 12, 2016 (DE) ...................... 10 2016 119 429.8

(51) Int. Cl.
*B30B 11/00* (2006.01)
*B23C 5/20* (2006.01)
(Continued)

(52) U.S. Cl.
CPC ............. *B30B 11/007* (2013.01); *B22F 3/03* (2013.01); *B22F 5/10* (2013.01); *B23C 5/207* (2013.01);
(Continued)

(58) Field of Classification Search
CPC .................. B30B 11/007; B23C 5/207; B23C 2200/0494; B23C 2200/367; B22F 3/03;
(Continued)

(56) References Cited

U.S. PATENT DOCUMENTS 8,616,866 B2 12/2013 Satran et al.
9,656,333 B2 5/2017 Stark
(Continued)

FOREIGN PATENT DOCUMENTS

DE 102010048183 A1 4/2012
DE 102013204370 A1 9/2013
(Continued)

OTHER PUBLICATIONS

International Preliminary Report on Patentability (Including Translation) for International Application No. PCT/EP2017/075948, dated Apr. 25, 2019.
(Continued)

*Primary Examiner* — Anthony J Zimmer
*Assistant Examiner* — Ricardo D Morales
(74) *Attorney, Agent, or Firm* — Jason H. Vick; Sheridan Ross, PC

(57) ABSTRACT

Manufacturing hard-metal pressed articles includes providing a multi-part die comprising a plurality of lateral mold parts defining lateral surfaces of a cavity for the article. At least one of the plurality of lateral mold parts defines a portion of an upper side of the cavity. The lateral mold parts and at least two lateral punch parts are fed. At least two of the plurality of lateral mold parts are provided with a guide recess for one of the at least two lateral punch parts. A filling unit feeds an opening of the cavity which is filled with a hard-metal powder. At least one upper mold part is fed, which defines a portion of the upper side of the cavity. The lateral mold parts and the upper mold part are held to form the cavity. The powder is compressed with at least two lateral punch parts and the part demolded.

16 Claims, 9 Drawing Sheets

(51) Int. Cl.
*B22F 3/03* (2006.01)
*B22F 5/10* (2006.01)
*B22F 5/00* (2006.01)

(52) U.S. Cl.
CPC ... *B22F 2003/031* (2013.01); *B22F 2005/001* (2013.01); *B23C 2200/0494* (2013.01); *B23C 2200/367* (2013.01)

(58) Field of Classification Search
CPC ................. B22F 5/10; B22F 2003/031; B22F 2005/001; B22F 3/16
See application file for complete search history.

(56) References Cited

U.S. PATENT DOCUMENTS

| 2006/0165828 A1* | 7/2006 | Smilovici ............. B30B 15/022 425/78 |
| 2009/0136776 A1* | 5/2009 | Gubanich ............. B30B 15/022 428/546 |
| 2013/0039798 A1 | 2/2013 | Satran et al. |
| 2017/0246687 A1 | 8/2017 | Schwarz et al. |

FOREIGN PATENT DOCUMENTS

| DE | 102012108752 B3 | 1/2014 |
| EP | 2808106 A1 | 12/2014 |
| EP | 2441573 B1 | 8/2015 |
| JP | 2008-528306 A | 7/2008 |
| JP | 2014-528838 A | 10/2014 |
| WO | WO 2013/024473 | 2/2013 |
| WO | WO 2015/120496 | 8/2015 |

OTHER PUBLICATIONS

International Search Report (including translation) for International Application No. PCT/EP2017/075948, dated Jan. 26, 2018.
Written Opinion for International Application No. PCT/EP2017/075948, dated Jan. 26, 2018.
Notification of Reasons for Rejection (Including Translation) for corresponding Japanese Patent Application No. 2019-520634, dated Jul. 7, 2020.

* cited by examiner

MANUFACTURING A HARD-METAL PRESSED ARTICLE

CROSS-REFERENCES TO RELATED APPLICATIONS

This application is a continuation of international patent application PCT/EP2017/075948, filed on Oct. 11, 2017 designating the U.S., which international patent application has been published in German language and claims priority to German patent application 10 2016 119 429.8, filed on Oct. 12, 2016. The entire contents of these priority applications are incorporated herein by reference.

BACKGROUND

The present disclosure relates to a method and a device for manufacturing a hard-metal pressed article and a hard-metal pressed article. The present disclosure also relates to the manufacture of blanks for the sintering of hard-metal components, for instance cutting tools. Cutting tools may include cutting inserts, indexable inserts and the like. The present disclosure further relates to a combination of a manufacturing device and a pressed article arranged therein.

Cutting tools made of hard-metal are generally sintered at high temperatures. For the manufacture of precisely shaped intermediate products, which are also referred to as pressed articles, blanks or green blanks, two essential methods are known. A first method relates to the primary forming manufacture by means of injection molding. Another approach relates to the manufacture of pressed articles using presses. The present disclosure primarily relates to the pressing of hard-metal powder at high pressures for the manufacture of pressed articles for the powder metallurgical manufacture of cutting tools and suchlike.

A tool for manufacturing a hard-metal pressed article is known from U.S. Pat. No. 8,616,866 B2, said tool having a central axis defining axial and radial directions, a base body having a through hole, radially aligned punch channels and radially aligned die channels, an upper punch and an opposite lower punch, a plurality of lateral punches arranged in pairs and radially movable in said punch channels, and a plurality of die rods which are radially movable in the die channels, wherein each die rod is associated with two adjacent lateral punches, each die rod having frontal die forming surface delimited by a die rod peripheral edge and two die guide surfaces diverging rearwardly therefrom, and wherein the two adjacent lateral punches are slidably movable on the die guide surfaces of the common die rod.

With this tool, generally complex contours can be formed which are suitable for cutting tools. However, such a tool has a complex structure and can only be operated with a high level of control effort. For instance, the parallel control of the main punch (upper punch and lower punch) as well as the secondary punch (lateral punches) is associated with high effort.

A disadvantage of this tool concept is that it is not possible with the mentioned tool structure, for example, to produce the cutting insert described for exemplary purposes in the context of the present disclosure by pressing, without generating cutting edges that are not affected, for instance crossed, by mold partitions or burrs. The same applies to similarly configured pressed articles.

Similar tool concepts are known from DE 10 2013 204 370 A1, EP 2 441 573 B1, and US 2017/0246687 A1. They relate to tools in which the main punch axes are formed by an upper punch and a lower punch. If lateral punches are provided at all, they are not main punches but only auxiliary punches. The hard-metal pressed articles produced in this way have a specific microstructure determined by the main pressing direction.

An example of a cutting insert is a so-called indexable insert. Such an insert is described in U.S. Pat. No. 9,656,333 B2. The advantage of this indexable insert is the presence of four cutting edges, whereby the cutting insert consists of two essentially identical partial bodies that are offset by 180° to each other, each forming two cutting edges. In other words, the cutting insert can be rotated by 180° about a central axis, so that two cutting edges can be used. In addition, the cutting insert can be rotated by 180° about an axis perpendicular to the central axis, so that two further cutting edges can be used (after the corresponding orientation of the rotation arrangement with respect to the central axis).

Blanks for such parts are regularly produced by injection molding and are post-processed to a considerable extent.

Cutting inserts of the aforementioned type, which are also specifically referred to as tangential cutting inserts, are mostly used in metalworking applications, for instance in milling or turning applications. The present cutting inserts are mainly used for so-called face milling and/or corner milling. Milling tools that use such cutting inserts typically include a rotationally symmetrical tool holder to which at least one, but usually a large number, of these cutting sets are detachably attached on the circumferential side.

The removal of material from the workpiece during the milling process is ensured by high-precision edges and/or cutting edges, which are formed into the cutting inserts. In order to keep wear as low as possible, to withstand the very high cutting forces occurring during processing, and to ensure preferably high precision, in certain embodiments, these cutting inserts are mostly made of hard-metal. However, due to the high material stress, the cutting edges wear out over time. Especially for milling operations that require high precision, the cutting inserts must therefore be replaced after a certain period of time.

In order to prevent the relatively expensive cutting inserts from having to be replaced in their entirety each time the cutting edges are worn out, multi-side cutting inserts have been developed which have several cutting edges that are arranged symmetrically to each other.

Furthermore, when designing dies for the powder metallurgical manufacture of hard-metal pressed articles, care is taken not to provide for a mold separation that runs over the cutting edges and/or transversely to them. Nevertheless, the cutting edges preferably lie in a separating plane, at least in certain embodiments. This can lead to the situation that blanks of certain cutting tools cannot be produced without post-processing or with only little post-processing when using presses.

A further challenge in the design of press tools for the manufacture of pressed articles for hard-metal tools concerns the demolding of inclined, pointed chamfers and/or tangential transitions which lead into the separation plane. This often means that parts of the die and/or parts of the press that reproduce the shape of the pressed article must be very thin-walled or pointed, at least in sections. This increases wear and tear and the risk of breakage and is therefore preferably avoided, at least in certain embodiments.

Hard-metal pressed articles are pressed at very high pressures, which can range from about 2000 to about 4000 bar (0.2 to 0.4 GPa). The pressing of hard-metal powder cannot easily be compared or even equated with the pressing of metal powder or other powdery materials. One reason for this is the so-called rebound behavior of pressed hard-metal pressed articles. These consist to a considerable extent of plasticizers (e.g. paraffin, waxes) and are porous, i.e. they contain air inclusions and/or cavities, in contrast to pressed articles based on metal powder. The rebound behavior can, for example, be reflected in an increase in volume after pressing, which can amount to about 3% of the initial volume.

Press devices for hard-metal pressing usually have no punches other than the main punches that are assigned to the main press axis. As already described above, the main punches are usually an upper punch and a lower punch, which can be moved vertically and, for instance, can be moved towards each other to produce the pressed article.

In the field of hard-metal powder metallurgy, these main punches cannot simply be supplemented by further (lateral) punches, which are similar to lateral slides in injection molding, but which function as punches. On the one hand, this is due to the high pressures during the pressing process. Such (lateral) punches would also have a negative influence on the press density distribution of the pressed article. The press density distribution is also referred to in the context of the present disclosure as the press structure distribution.

The above limitation does not preclude the occasional use of slave or auxiliary punches which are displaceable along a plane which is inclined with respect to the vertical. However, such auxiliary punches are usually only used to create subordinate contours, such as recesses, lateral depressions or similar. The effective area with which such an auxiliary stamp acts on the pressed article is usually considerably smaller than the area of the respective side of the diene wall that surrounds the pressed article.

In order to create a component structure that is as favorable as possible, for instance a sufficiently homogeneous press density, it is usually aimed at dimensioning the main punches in such a way that they cover the silhouette and/or outline of the pressed article as completely as possible when viewed in a vertical direction. If this were not the case, i.e. a main punch would be significantly smaller than the silhouette of the pressed article, this would result in unfavorable stress and/or pressure structure during pressing, since the entire cross-section of the pressed article would not be directly exposed to the pressing pressure generated (primarily) by the main punches.

Apart from the punches, a die for pressing blanks for the manufacture of hard-metal cutting tools usually comprise further mold parts, which are, however, is not actively involved in the pressing process (as an actuated punch). Such mold parts can generally be movable and are then referred to as slider, for instance. However, solid mold parts are also conceivable. In general, the mold parts are not moved during the pressing process itself. Movable mold parts, such as sliders or the like, are moved for the demolding process in order to demold the pressed article.

In view of this, it is an object of the present disclosure to present a method and a device for the near-net-shape manufacture of hard-metal pressed articles.

It is a further object of the present disclosure to present a method and a device that are suitable for the manufacture of sinter raw parts for cutting tools, which allow a high degree of design freedom with regard to the tool geometry.

It is a further object of the present disclosure to present a method and a device that are suitable for manufacturing with a favorable pressing microstructure and/or with a favorable pressing density structure, at least in certain embodiments.

It is a further object of the present disclosure to present a method and a device that simplify the manufacture of hard-metal pressed articles with multiple symmetrical designs.

It is a further object of the present disclosure to present a method and a device that simplify the manufacture of pressed articles whose cutting edges are designed to be rotationally symmetrical with respect to an axis, such as a central axis, and which are further designed to be rotationally symmetrical with respect to a central plane. In this way, the resulting cutting tool can be rotated around two spatial axes so that one of four cutting edges can respectively be brought into position, at least in certain embodiments.

It is a further object of the present disclosure to present a method and a device that are suitable for the manufacture of pressed articles for cutting tools that have cutting edges that are oriented in opposite directions and facing away from each other.

It is a further object of the present disclosure to present a method for the manufacture of hard-metal pressed articles for cutting tools, which allows the production of cutting edges, which are not affected, for instance crossed, by mold separations or burrs.

It is a further object of the present disclosure to present a method and a device which allow the use of considerably robustly designed punches and, in some embodiments, also mold parts, which do not include excessively thin and pointed sections, for instance.

SUMMARY

In regard of the method, these and other objects are achieved by a method for the near-net-shape manufacture of hard-metal pressed articles, for instance for the manufacture of sinter raw parts for cutting tools, the method comprising the following steps:

providing a multi-part die comprising a plurality of lateral mold parts defining the lateral surfaces of a cavity for a pressed article, wherein at least one lateral mold part further defines a portion of an upper side of the cavity, feeding the lateral mold parts, feeding of at least two lateral stamp parts, wherein at least two lateral mold parts are provided with a guide recess for a lateral punch part, feeding a filling unit above an opening of the cavity, and filling the cavity with a hard-metal powder, feeding at least one upper mold part, which defines a portion of the upper side of the cavity, firmly holding the lateral mold part and the upper mold part, compressing the powder with at least two lateral punch parts, and opening the lateral mold parts, the upper mold part and the punch parts to demold the pressed article.

The method allows the manufacture of pressed articles, which previously could only be produced with high post-processing efforts. Furthermore, the method may at least partially replace or at least complement the manufacture of sinter raw parts for cutting tools by injection molding. The arrangement of the lateral mold parts as well as the lateral punch parts according to the method allows greater freedom of design. In this way, for instance, workpieces can be pressed and demolded which, according to conventional methods, could not be easily produced by pressing.

An advantage of manufacturing according to the method is that the used mold part and punch parts are robust and can be formed without excessive wall thickness reduction. Furthermore, the arrangement of the mold part and the punch parts allows a favorable microstructure or pressure curve during pressing. The pressed articles produced in this way exhibit a high degree of homogeneity.

Within the scope of the manufacturing method, pressed articles can be produced for components whose raw sintered cutting edges are superior to ground cutting edges in terms of service life and wear behavior. The cutting edges can be produced near-net-shape or even true to the final contour directly during pressing, without the need for extensive reworking by grinding.

In certain embodiments, the upper mold part uncovers the opening of the cavity for filling the cavity with the hard-metal powder when the upper mold part is removed from the cavity.

In an exemplary embodiment, at least one lateral mold part forms a portion of the upper side of the cavity. The upper mold part forms another (different) portion of the upper side of the cavity. In another exemplary embodiment, the same mold part or another mold part forms a portion of the lower side of the cavity. When a lower mold part is used, it forms a further (different) portion of the lower side of the cavity.

The method is, in certain embodiments, suitable for manufacturing pressed articles, on the basis of which cutting tools or cutting inserts are produced, which have upper sides and lower sides that are substantially symmetrical (but twisted relative to one another), between which a circumferential portion extends, in which rake faces or chip grooves of cutting edges are formed. Relief faces of the cutting edges are associated with the upper side or the lower side, in certain embodiments. The cutting edges are partly assigned to the upper side and partly to the lower side.

The firmly holding of the mold part can be force controlled and/or travel controlled. The goal of the firmly holding is to secure the position. Accordingly, firmly holding can be carried out by means of form-fit, force-fit or in an appropriate combination. Firmly holding can also be described as locking or fixing, even if the position is essentially secured by applying a correspondingly high holding force.

In certain embodiments, it is preferred if no other, especially vertical, punch parts are provided in addition to the lateral punch parts. The main punches are the lateral punch parts. In accordance with exemplary embodiments, lateral punch parts are used exclusively. In other words, the manufacturing method represents a departure from conventional pressing methods in which pressed articles for hard-metal tools are primarily compressed by vertical punches that define the main press axes.

According to an exemplary embodiment, the method further includes the steps of:
 providing at least one lateral mold part, which further defines a portion of a lower side of the cavity,
 feeding at least one lower mold part, which defines a portion of a lower side of the cavity, and
 firmly holding the lower mold part together with the firm holding of the lateral mold parts and the upper mold part.

In this way, neither the upper side of the cavity, via which the cavity is filled with hard-metal powder, nor the lower side of the cavity is provided with a stamp. The desired shape of the pressed article on the upper side and on the lower side can be defined by the lower mold part and the upper mold part. Furthermore, transitions, such as radii, chamfers or the like, between upper/lower base areas of the pressed article and a circumferential portion can be defined by the (lateral) mold parts. An advantage of this design is that the lateral mold part in this area can be thick-walled. This increases the robustness and service life of the die.

According to a further exemplary embodiment, at least one lateral mold part is provided, which, in addition to at least one lateral surface of the cavity, also forms a portion of the upper side and a portion of the lower side of the cavity.

According to another exemplary embodiment, the lateral mold parts, the upper mold part and the lower mold part are locked and/or held during compression, wherein the lateral punch parts are moved to compress the powder. In certain embodiments, there are no other punch parts apart from the lateral punch parts. Nevertheless, according to at least some embodiments, it is not completely excluded that auxiliary punches and the like are provided. In certain embodiments, however, it is preferred if the lateral punch parts define the main punch axes or main press axes.

During compression or pressing, the lateral mold parts, the upper mold part and the lower mold part are fixed, in certain embodiments. Compressing takes place through the punch parts.

According to another exemplary embodiment, the compression comprises a lateral compression through the punch parts, wherein a respective direction of movement of the punch parts is oriented parallel to a plane which is oriented obliquely, for instance perpendicularly, to a feed direction of the upper mold part.

Thus main pressing directions are, for example, oriented parallel to a horizontal plane and not perpendicular to it. In certain embodiments, a plurality of punch parts are provided, which are arranged in a star shape around the cavity. In this way, a plurality of press axes can be implemented, so that overall a homogeneous microstructure can be achieved.

According to another exemplary embodiment, the lateral mold parts and the punch parts are movable parallel to a first plane, for instance a horizontal plane, where the upper mold part, for instance also the lower mold part, is movable parallel to a second plane, for instance a vertical plane. In other words, in certain embodiments, the mold part is movable perpendicular to a direction of motion of the upper mold part and/or the lower mold part. The punch parts can each be moved in a transverse direction relative to the cavity.

According to a further exemplary embodiment, the upper mold part is coupled to a vertical slider which forms a recess in the pressed article, for instance a recess projecting vertically through the pressed article, wherein the vertical slider is movable parallel to the upper mold part, and wherein for instance also the lower mold part is coupled to a corresponding vertical slider.

Alternative embodiments are conceivable in which the vertical slider is integrated into the upper mold part and/or the lower mold part. According to further exemplary embodiments, the upper mold part and the associated slider and the lower mold part and the associated slider are movable relative to each other.

In certain embodiments, the upper mold part comprises a guide recess for a vertical slider. In certain embodiments, the lower mold part has a guide recess for a vertical slider. Accordingly, a compact design of the die can be achieved. If two vertical sliders, an upper vertical slider and a lower vertical slider, can be used, a recess or through hole can be formed in the pressed article, which is completely or essentially symmetrical to a horizontal central plane of the pressed article.

According to another exemplary embodiment, the step of feeding the lateral mold parts includes a feeding of three or more lateral mold parts that are movable toward and away from each other to open or close the cavity.

According to at least some exemplary designs, the cavity is formed exclusively by the movable mold part and the punches. Accordingly, the cavity is not formed by fixed die parts. The three or more lateral mold parts are approximately circular and/or circumferentially distributed around a center of the cavity and can be moved toward the center of the cavity.

According to an exemplary further refinement of this embodiment, the lateral mold parts together define a horizontal boundary for the pressed article. In other words, a circumferential portion of the pressed article that extends between an upper and a lower base area is not formed by fixed/rigid die parts. If the cavity is exclusively or almost completely formed by a movable mold part on the die side, the design freedom is further increased.

According to another exemplary embodiment, the cavity and a resulting shape of the pressed article are entirely defined by moving die parts and punch parts.

According to another exemplary embodiment, each lateral mold part comprises a punch part assigned thereto, which is arranged in the guide recess, wherein a direction of movement of the punch part is parallel to the direction of movement of the lateral mold part. In this way, a pressed article can be produced, on the basis of which a cutting insert can be produced that has a plurality of cutting edges.

According to another exemplary embodiment, at least two punch parts, for instance two pairs of punch parts, are vertically offset from each other. This has the advantage that a considerably homogeneous and favorable microstructure can be achieved, at least in certain embodiments. The pressed article is thus compressed not only in one direction, but in two or even more directions. A further advantage of this design is that there is also greater design freedom for the mold parts of the die, as further portions of the resulting cavity can be put under pressure by the punch parts.

According to another exemplary embodiment, the punch parts form portions of the shape of the pressed article that are not vertically demoldable. This may involve, for instance, rake faces, which are designed like troughs. For instance, if the pressed article has three, four or more cutting edges distributed over a circumferential portion of the pressed article, for instance, the rake faces cannot easily be demolded using conventional methods.

According to another exemplary embodiment, the lateral mold parts form a transition between a circumferential portion and at least one upper or lower base area of the pressed article, the transition comprising, for instance, a radius or chamfer.

Such an area cannot easily be formed by the upper mold part and/or the lower mold part. This would lead to a significant reduction in wall thickness for vertically movable mold parts. It is advantageous to arrange the lateral mold parts moveable, since in this way corresponding transitions can be formed on the upper side and the lower side of the pressed article. Nevertheless, the pressed article can easily be demolded if the mold part is movable.

According to another exemplary embodiment, at least one upper or lower base area, in certain embodiments both base areas, of the pressed article is formed in the cavity without punches. In other words, the stamp-free forming of the upper base area and/or the lower base area allows a microstructure that is essentially caused by the lateral punches.

According to another exemplary embodiment, four lateral mold parts are provided for forming a pressed article for an indexable insert with rhombic shape, wherein the lateral mold parts define, at least sectionally, four sides of the pressed article and are coupled to four lateral punch parts that define four rake faces on four circumferential sides of the pressed article, wherein an upper mold part is provided for forming an upper base area and a lower mold part is provided for forming a lower base area, which are coupled to an upper vertical slider and a lower vertical slider which contact one another, wherein the upper vertical slider and the lower vertical slider together form a through opening on the pressed article.

In certain embodiments, such a pressed article is suitable for manufacturing an indexable insert, which is equipped with four cutting edges, divided into two pairs, for example. Each pair of cutting edges is assigned to the upper side of the pressed article and the lower side of the pressed article. The cutting edges of the pair on the upper side are arranged opposite each other. The cutting edges of the pair on the lower side are arranged opposite each other. The pairs of the upper side and the lower side are oriented crosswise relative to each other. Such an indexable insert is described as an example in U.S. Pat. No. 9,656,333 B2, for instance.

The rhombic shape may also be referred to as a diamond shape. The rake face is, for instance, a chip groove on a side of the circumferential portion of the pressed article.

In another aspect, the present disclosure also relates to a method for manufacturing hard-metal cutting tools, for instance cutting inserts, the method comprising:
  manufacturing a pressed article according to an embodiment of the method as described herein,
  parts handling with only little post-processing or without post-processing, for instance transfer from a pressing plant to a sintering plant, and
  sintering the pressed articles.

Parts handling means, for instance, parts manipulation, which includes, for example, transferring the pressed articles from the press plant to a sintering plant. If necessary, temporary storage can take place in between. However, defined processing steps can also be carried out on the pressed article, such as automated deburring, for instance. Deburring can be carried out by brushing or blowing and usually aims at unpressed components on the pressed article.

The manufacture of the pressed article according to an embodiment of the method described herein significantly reduces the post-processing effort.

In regard of the device, the above and other objects of the disclosure are achieved by a device for the near-net-shape manufacture of hard-metal pressed articles, for instance for the manufacture of sinter raw parts for cutting tools, which device comprises a bed, a multi-part die for forming a cavity for a pressed article, the die comprising a plurality of lateral mold parts defining lateral surfaces of the cavity, wherein at least one lateral mold part further defines a portion of an upper side of the cavity, an upper mold part defining a portion of the upper side of the cavity, a punch unit having at least two lateral punch parts, wherein at least two lateral mold parts are respectively provided with a guide recess for a lateral punch part, and a filling unit comprising a filling shoe which is feedable to an opening of the cavity to fill the cavity with a hard-metal powder, wherein the lateral mold parts and the upper mold part are movable between an open position and a closed position, wherein the lateral mold parts and the upper mold part in the closed position define surfaces of the pressed article, wherein the lateral punch parts are movable along the guide recesses in the lateral mold parts to compress the powder, and wherein a direction of movement of the punch parts is oriented parallel to a plane that is oriented obliquely, for instance perpendicularly, to a feed direction of the upper mold part.

According to an exemplary embodiment, the device further comprises a lower mold part defining a portion of a lower side of the cavity, wherein at least one lateral mold part further defines a portion of a lower side of the cavity, and wherein the lateral mold part, the upper mold part and the lower mold part are lockable and/or fixable in the closed position.

According to another exemplary embodiment, the lateral mold parts and the lateral punch parts are movable parallel to a first plane, for instance a horizontal plane, wherein the upper mold part, for instance also the lower mold part, are movable parallel to a second plane, for instance a vertical plane.

According to another exemplary embodiment, the device further comprises a holding unit or fixation unit that fixes the lateral mold parts, the upper mold part and the lower mold part in the closed position to form a circumferential portion of the pressed article.

According to a further exemplary embodiment, the upper mold part is coupled to a vertical slider which forms a recess in the pressed article, for instance a recess projecting vertically through the pressed article, wherein the vertical slider is movable parallel to the upper mold part, and wherein, for instance, also the lower mold part is coupled to a corresponding vertical slider.

According to another exemplary embodiment, the compression of the powder is substantially, in certain embodiments exclusively, performed by the lateral stamp parts.

According to another exemplary embodiment, the lateral mold parts form a transition between a circumferential portion and at least one upper or lower base area of the pressed article, wherein the transition comprises, for instance, a radius or chamfer.

According to a further aspect, the present disclosure relates to a hard-metal pressed article, for instance a pressed article produced with only little post-processing or without post-processing, for an indexable tool, the article comprising two base areas which are arranged opposite one another, a circumferential portion extending between the two base areas, and comprising a plurality of cutting edges defined by a separation course of a multi-part die, wherein at least one cutting edge is assigned to a first base area and at least one cutting edge is assigned to a second base area, wherein the cutting edges in the circumferential portion are associated with trough-shaped rake faces which cannot be demolded perpendicularly to the base areas, wherein the cutting edges and the rake faces are defined at least partially by punch parts, which are feedable transversely to a normal of the base area and effect a correspondingly oriented microstructure, and wherein the base areas are defined stamp-free by mold parts, which are feedable transversely to the normal of the base areas, and by mold parts, which are feedable parallel to the normal base area.

Such a pressed article can be manufactured according to an embodiment of the method described herein. In certain embodiments, the pressed article is manufactured in an embodiment of the device described herein.

The pressed article is, for instance, a hard-metal cutting insert that has four cutting edges (A, B, C, D), two of which (A, B and C, D) are rotationally symmetrical to each other with respect to a central axis. There is also symmetry between an upper side (comprising cutting edges A and B) and a lower side (comprising cutting edges C and D) of the cutting insert. In certain embodiments, the pressed article does not have any burrs which cross edges of the cutting edges and which are caused by the die of the pressing device.

If a cutting tool has been produces on the basis of the pressed article that has been produced with only little post-processing or without post-processing, it can be seen whether it has been produced according to an embodiment of the method described herein and/or in an embodiment of the device described herein. For instance, burr patterns, the pattern of the separation plane and the remaining design, such as areas that cannot be easily demolded by means of (lateral) sliders, allow a corresponding conclusion to be drawn.

At the pressed article there can, for instance, be formed with only little post-processing or without post-processing: Cutting edges, tangential transitions, chip grooves, relief faces or relief angles, tapers and the like.

The disclosure is not limited to such cutting inserts, for instance not exclusively to the cutting inserts described above with four specifically arranged and aligned cutting edges. Nevertheless, reference is made to this type of cutting inserts for illustrative purposes.

According to a further aspect, the present disclosure relates to a combination of a device for the near-net-shape manufacture of hard-metal pressed articles, which forms a cavity, and a pressed article that is accommodated in the cavity. The device is arranged in accordance with at least embodiments as disclosed herein.

It is to be understood that the manufacturing method has similar and/or identical exemplary embodiments as the manufacturing design, and vice versa, in particular as defined in the dependent claims and as disclosed in the embodiments discussed herein.

It is to be understood that the previously mentioned features and the features mentioned in the following may not only be used in a certain combination, but also in other combinations or as isolated features without leaving the spirit and scope of the present disclosure.

BRIEF DESCRIPTION OF THE DRAWINGS

Further features and advantages of the disclosure are disclosed by the following description of a plurality of exemplary embodiments, with reference to the drawings, wherein.

DETAILED DESCRIPTION OF EXEMPLARY EMBODIMENTS

With reference to FIGS. 1, 2, 3 and 4, an exemplary embodiment of a pressed article 10 is illustrated which can be used for the powder metallurgical manufacture of a hard-metal tool, for instance a cutting insert. In certain embodiments, the pressed article 10 can be produced according to at least some embodiments of the present disclosure without post-processing or with only little post-processing using powder pressing. However, this requires a specific design of a device or a specific method for manufacturing the pressed article 10.

From U.S. Pat. No. 9,656,333 B2 there are known at least similarly designed cutting inserts. However, it was previously necessary to produce the sinter raw parts for the manufacture of such cutting tools by injection molding and extensive post-processing. According to the present disclosure, the pressed article 10 can be produced with only little post-processing or without post-processing by means of a pressing process. In other words, the injection molding based manufacture of the sintered blank can be replaced by an at least near-net-shape pressing method.

It goes without saying that pressed article 10 serves primarily as an illustrative example of a great variety and multitude of other pressed articles, the manufacture of which can be carried out in accordance with the aspects and embodiments described herein that use the described device and/or the described method.

Figure 1:
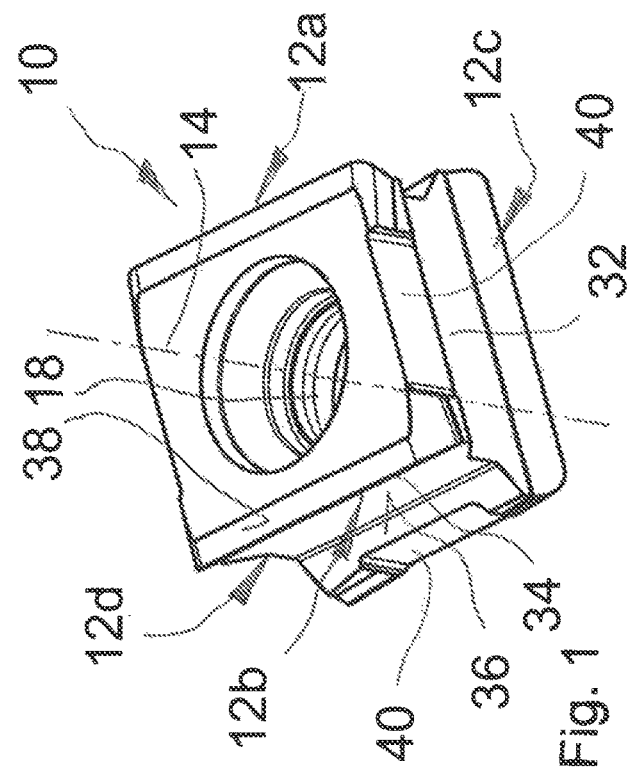
FIG. 1 is a perspective view of a hard-metal cutting tool that can be produced according to at least some aspects of the present disclosure.

It can be seen from FIGS. 1, 2, 3 and 4 in combination that the pressed article 10 has a total of four cutting edges 12, which are designated in FIG. 1 by 12a, 12b, 12c, and 12d (hidden in FIG. 1). Furthermore, the pressed article 10 has a central axis 14 that is defined by a recess 18. The central axis 14 is also a symmetry axis for some design features. The recess 18 is used to attach the cutting insert produced on the basis of pressed article 10 to the tool.

If the cutting insert based on the pressed article 10 is rotated by 180° about the central axis 14, a first cutting edge 12a and a second cutting edge 12b can be used consecutively. However, the pressed article 10 has a total of four contours that define cutting edges 12a, 12b, 12c and 12d.

In order to be able to use the other cutting edges 12c and 12d, the pressed article 10 is not only by 180° rotationally symmetrical with respect to the central axis 14. There is also provided a central plane or symmetry plane 20, see FIG. 3. In other words, the cutting edges 12a, 12b are arranged on one side of the central plane 20, and the cutting edges 12c and 12d are arranged on the other, opposite side of the central plane 20. Accordingly, the cutting tool based on the pressed article 10 can be inverted, starting from one side of the central plane 20, to make the other side usable. In other words, the cutting insert based on the pressed article 10 can be rotated or swiveled about the central axis 14 and/or around another axis located in the central plane 20 to make one of the four cutting edges 12a, 12b, 12c and 12d usable.

The middle plane 20 subdivides the pressed article 10 into a first partial body 24 and a second partial body 26, which are basically similar, in certain embodiments identical, and which have a defined rotational position relative to each other.

Base areas 28, 30 are formed on the pressed article 10. The base area 28 may also be referred to as the upper base area. The base area 30 may also be referred to as the lower base area. The base areas 28, 30 extend essentially parallel to the middle plane 20.

Between the base areas 28, 30, a circumferential portion 32 is formed. For example, the circumferential portion 32 comprises a total of four (lateral) sides, each of which is assigned to a cutting edge 12a, 12b, 12c, 12d.

The cutting edges 12a, 12b, 12c, 12d each comprise a (cutting) edge 34 which extends between a rake face 36 and a relief face 38. The rake face 36 can also be referred to as a chip trough. The relief face 38 is assigned to one of the base areas 28, 30. For instance, it can be seen from the illustration shown in FIG. 4 that the relief face 38 is slightly inclined with respect to the base area 28, 30 and/or the central plane 20.

Further, the pressed article 10 has a total of four abutment surfaces 40, each of which is assigned to one side of circumferential Portion 32. The abutment surfaces 40 are designed to align the pressed article 10 when it is mounted on a machining tool 60 (see FIG. 5).

On each of the four sides of circumferential portion 32, the respective cutting edge 12 is assigned to one of the two base areas 28, 30 and the abutment surface 40 is assigned to the other one of the base areas 28, 30. Opposite sides of the circumferential portion 32 have a 180° rotationally symmetrical design with respect to the central axis 14. Neighboring sides of the circumferential portions 32 show an alternating assignment between the cutting edges 12, the abutment surface 40 and the base areas 28, 30, cf. again FIGS. 1 to 4.

Figure 2:
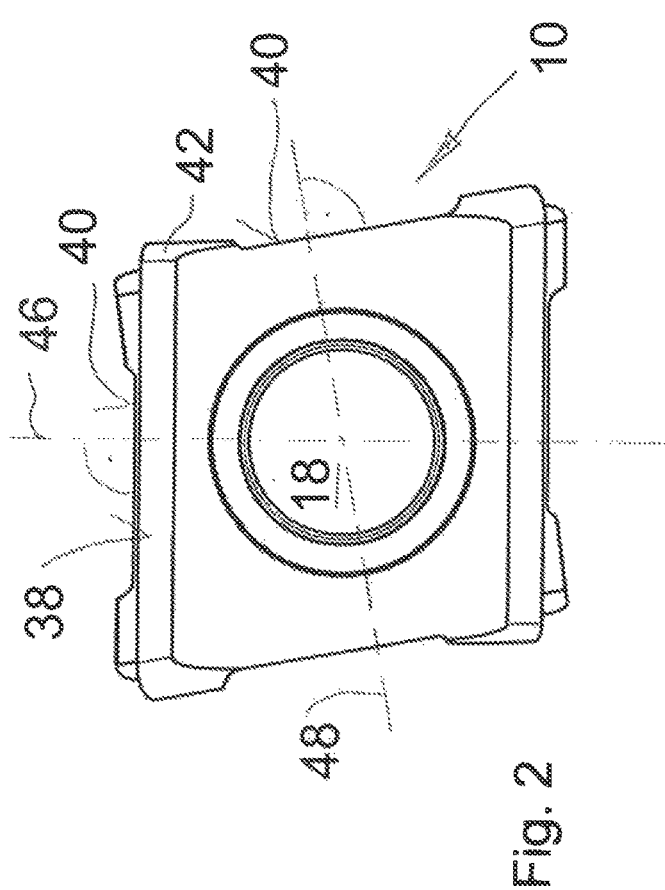
FIG. 2 is a top view of the arrangement according to FIG. 1.

FIG. 2 shows that pressed article 10 has a rhomboidal design, i.e. a slight entanglement. In FIG. 2, the transverse directions indicated by 46, 48 are defined as normal to the abutment surfaces 40. It can be seen that the directions 46, 48 are not exactly perpendicular to each other.

Figure 5:
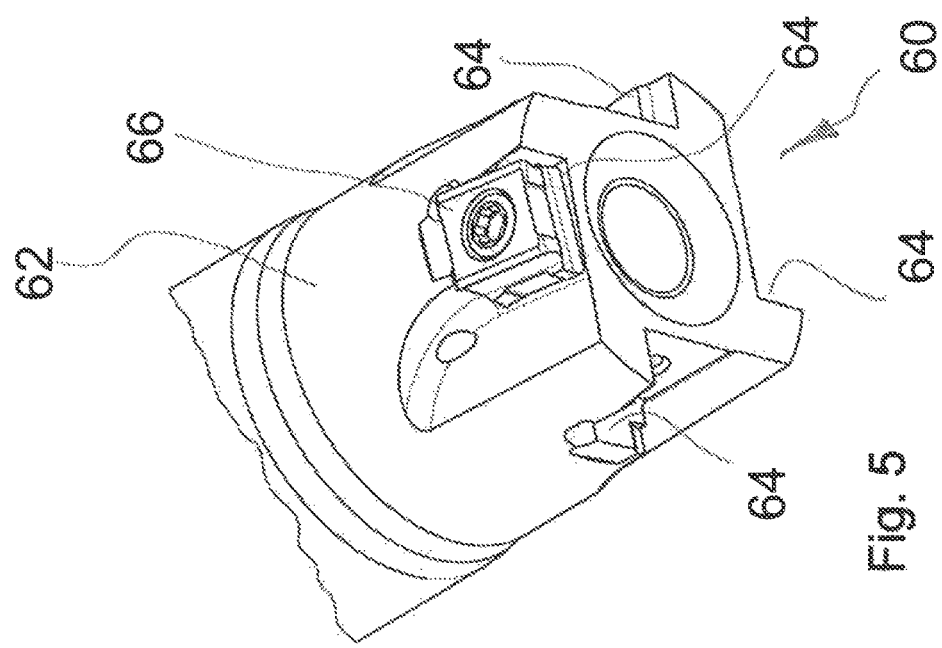
FIG. 5 is a partial perspective view of a head of a tool that can be equipped with hard-metal indexable inserts.

FIG. 5 illustrates, by means of a partial illustration of a machining tool 60, a possible use of a cutting insert 66, which can be produced on the basis of pressed article 10. The cutting insert 66 may also be referred to as a cutting plate. For instance, the cutting insert 66 is designed as an indexable insert with four cutting edges.

The exemplarily illustrated machining tool 60 is an end mill which is equipped with a shank 62. At a machining end of the shank 62, four receptacles 64 are formed, which have corresponding recesses in order to be able to accommodate a cutting insert 66 each. The position allocation and alignment of the cutting inserts 66 is carried out via the abutment surfaces 40 and the base areas 28, 30, see again FIG. 1, FIG. 2, FIG. 3 and FIG. 4. The cutting insert 66 is usually fastened using a screw or a similar fastening element which projects through the recess 18. The cutting insert 66 may also be referred to as a tangential cutter.

The embodiment of the pressed article 10 and the cutting insert 66 based thereon illustrated with reference to FIGS. 1 to 5 show that a primary forming manufacture of a corresponding sinter blank is subject to certain boundary conditions.

On the one hand, a total of four cutting edges 12a, 12b, 12c and 12d are formed over the circumferential portion 32 of the pressed article 10. In other words, a common press tool with an upper punch and a lower punch defining a main press axis cannot be used to form respective contours on all four sides of the circumferential portions 32.

Figure 4:
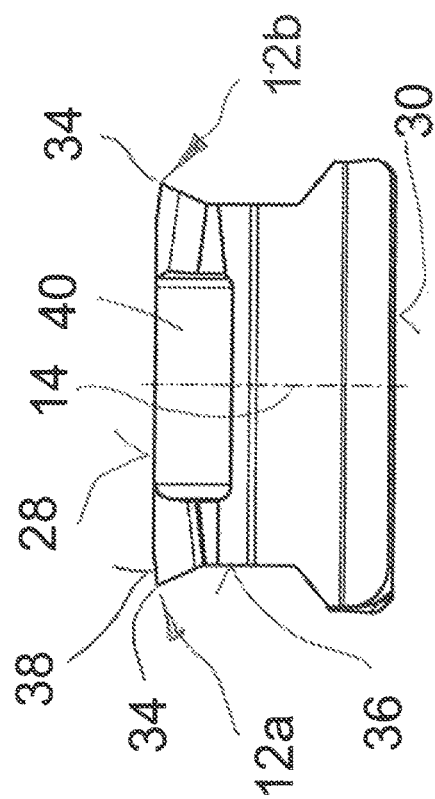
FIG. 4 is a second side view of the arrangement according to FIG. 2.
Figure 3:
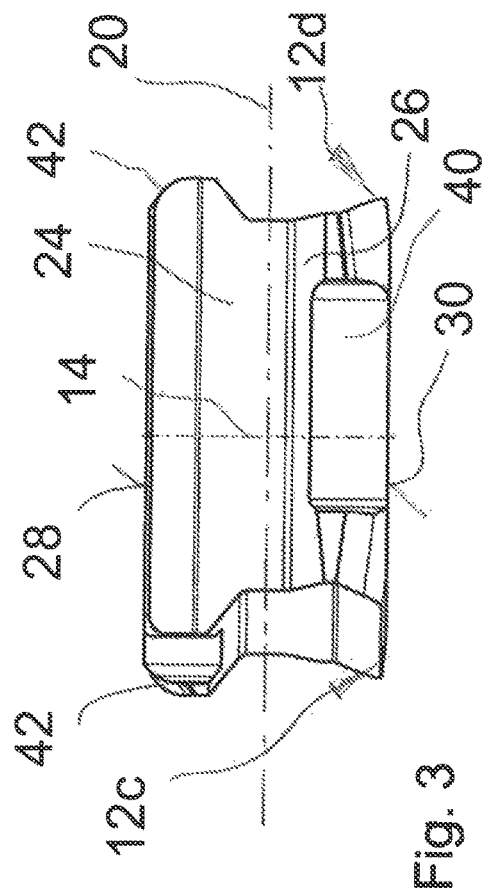
FIG. 3 is a first side view of the arrangement according to FIG. 2.
Figure 6:
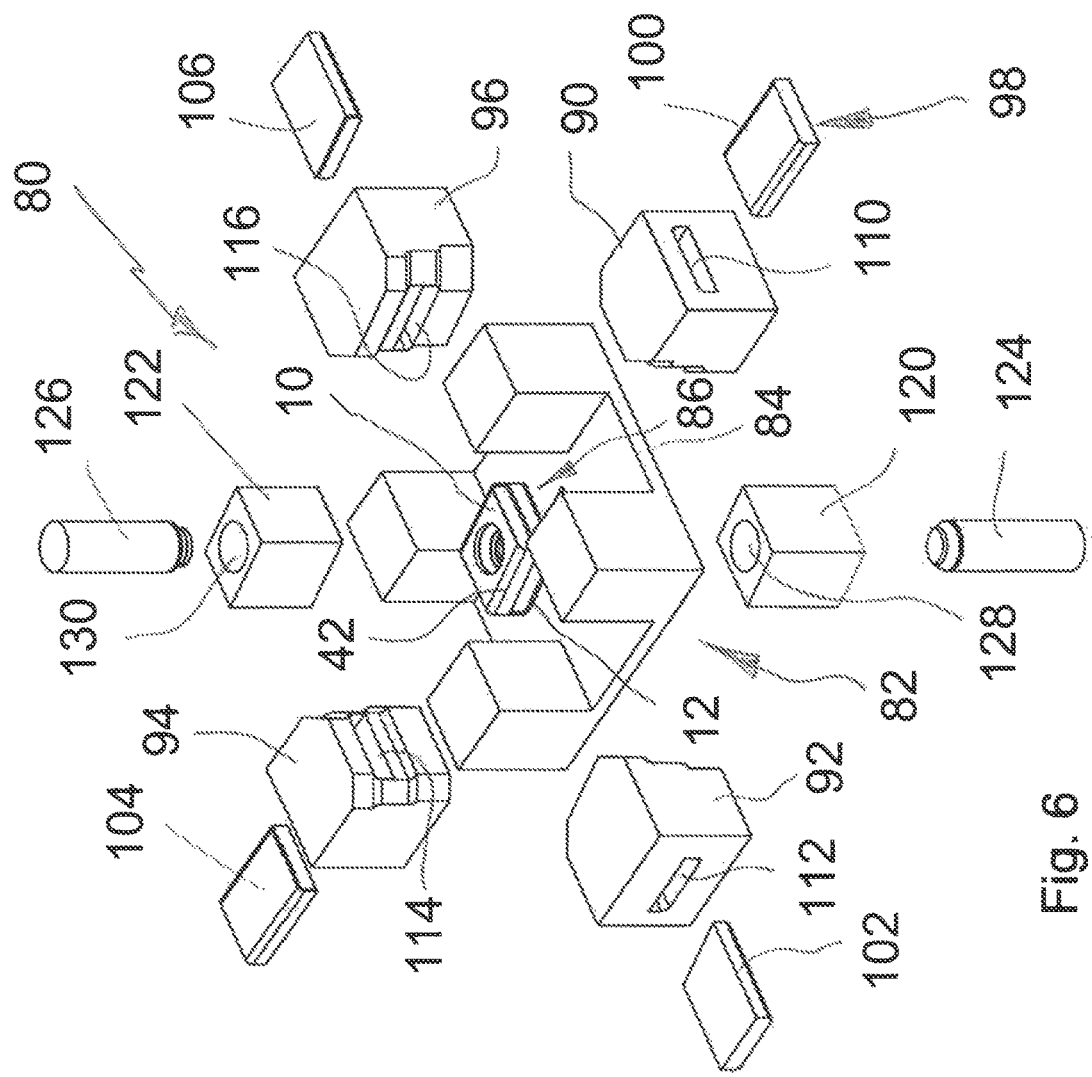
FIG. 6 is a schematic perspective representation of a pressing device for hard-metal pressed articles, in an exploded state.

Nevertheless, it is advantageous to arrange the pressed article 10 in such a way that the base areas 28, 30 in a cavity of a press tool are assigned to an upper side and a lower side respectively. In other words, lateral forming sections must be provided for forming the circumferential portions 32. With reference to FIG. 4, it becomes apparent that the trough-shaped rake face 36 cannot be demolded "from above" or "from below", i.e. parallel to the central axis 14, without further ado. In certain embodiments, in the area of the (cutting) edge 34, the transition from the relief face 38 to the rake face 36 results in a thin, pointed contour. In this region, a punch "from above" or "from below" cannot easily be used to compress the hard-metal powder. In the area of the (cutting) edges 34, there would then be a risk of fractures and the like.

If, however, the area of the relief face 38 and the rake face 36 is formed exclusively by fixed die parts, no sufficiently high pressing pressure can be generated in this pointed edge area. In other words, in areas of the pressed article 10 that will later be subjected to high loads there could be portions that are not sufficiently compressed.

A further boundary condition concerns the desired microstructure and/or microstructure for the cutting edges 12a, 12b, 12c and 12d. During operation, each of the four cutting edges 12a, 12b, 12c, 12d should have similar or even identical properties, service lives, strengths and such like. For this reason, the pressed article 10 cannot be produced with a pressing tool which has, for example, an upper punch and a lower punch which act as main punches which interact with (lateral) auxiliary punches. Such a design would have the result that the desired homogeneity—concerning the cutting edges 12a, 12b, 12c, 12d—would not be provided without further ado.

An option for manufacturing a sintered blank with a design according to FIGS. 1, 2, 3 and 4 is therefore injection molding. However, this still requires considerable post-processing. In addition, the hard-metal powder cannot be distributed as evenly in the injection molding process as in the pressing process according to the present disclosure, which leads to considerable dimensional differences between the four cutting edges of the sintered injection molded part.

It is advantageous if the course of the (cutting) edges 34 of the respective cutting edges 12 is defined by a separation course and/or separation plane in the press tool. A further boundary condition is that, if possible, no separation burrs transverse to the course of the (cutting) edges 34 is provided.

With reference to FIGS. 6 to 18, aspects and embodiments of a device and a method for the near-net-shape manufacture of hard-metal pressed articles are illustrated below. The device is overall designated by 80. According to at least one exemplary embodiment, the device 80 is designed to produce hard-metal pressed articles based on hard-metal powder, the shape of which is at least similar to that of the pressed article 10 illustrated in FIGS. 1 to 4.

Figure 7:
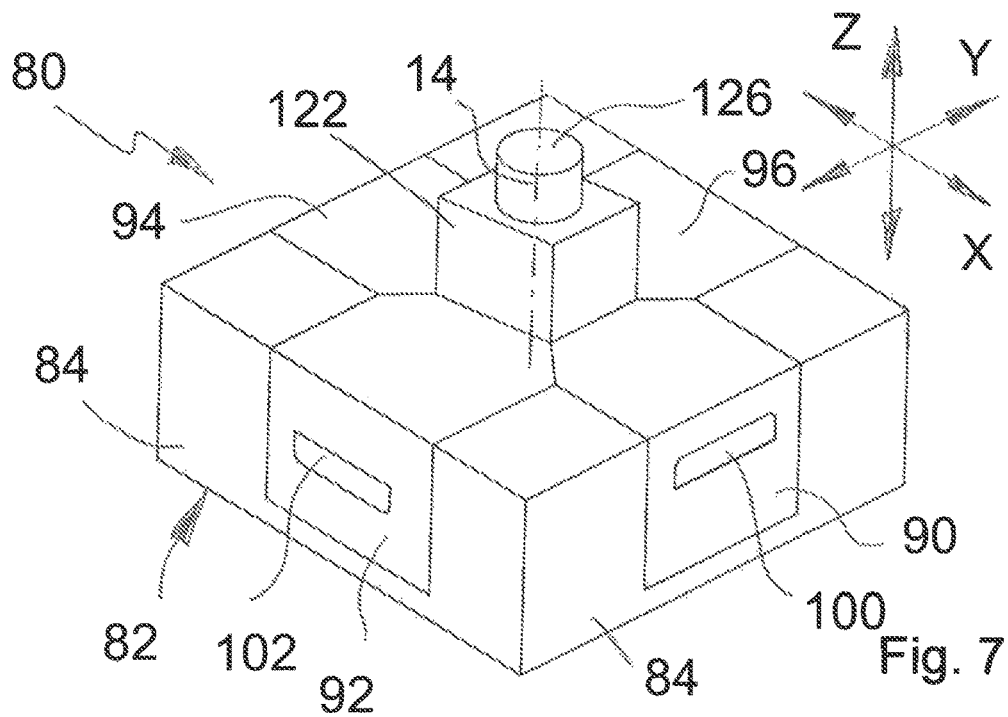
FIG. 7 is a perspective representation of the device according to FIG. 6 in a closed state.
Figure 13:
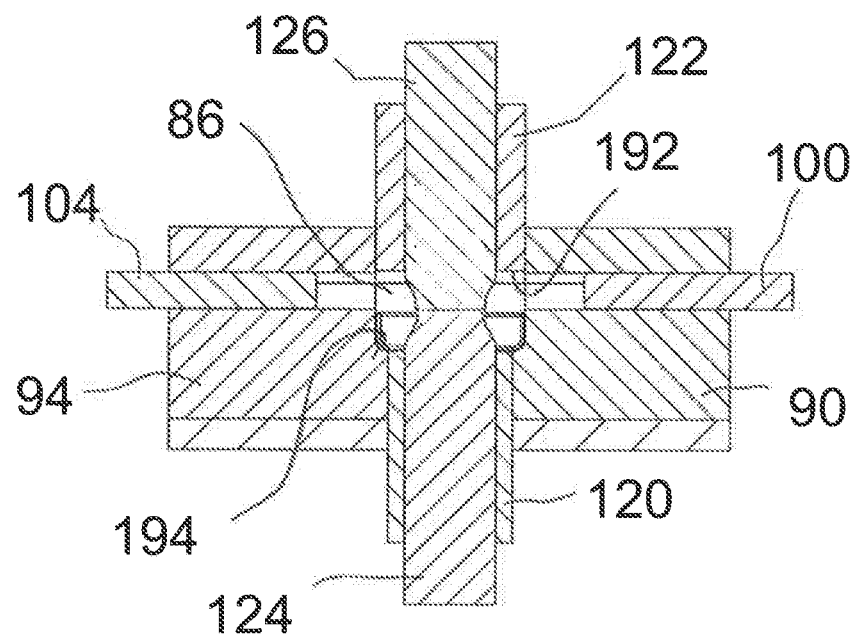
FIG. 13 is a sectional view of the arrangement according to FIG. 12 along the line XIII-XIII.
Figure 14:
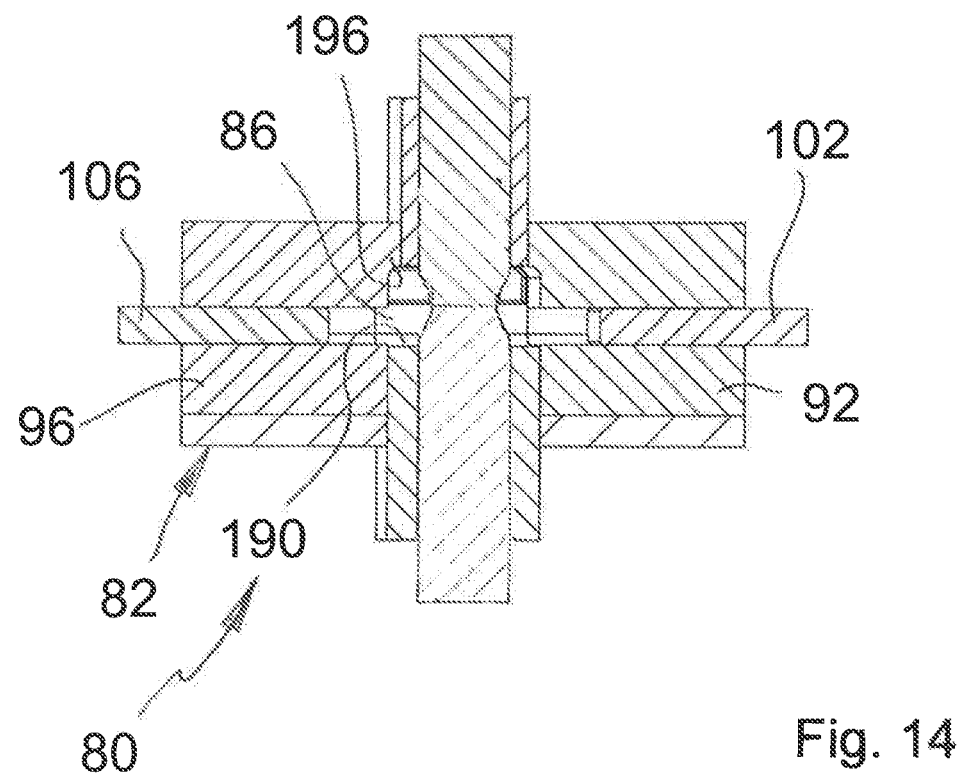
FIG. 14 is a sectional view of the arrangement according to FIG. 12 along the line XIV-XIV.
Figure 15:
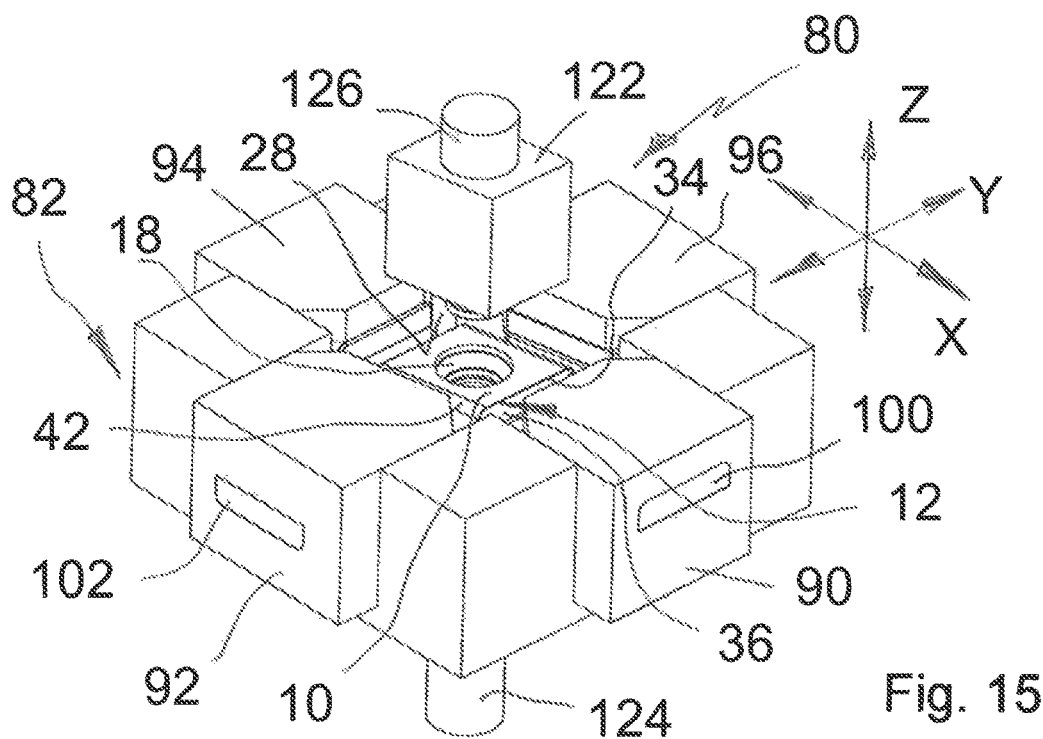
FIG. 15 is a further perspective representation of the arrangement according to FIG. 6 in an orientation according to FIG. 7, wherein the device is in a third state.

For illustrative purposes, FIGS. 6 to 18 show simplified representations of the pressed article 10 and components of the device 80. The orientation of the pressed article 10 and the device 80 is elucidated by a coordinate system X, Y, Z, which is shown in FIGS. 7, 11 and 15. In the exemplary embodiments illustrated, the Z axis denotes a height direction or vertical direction. Any plane arranged parallel to the Z-axis can be referred to as a vertical plane. An X-axis denotes a longitudinal direction. A Y-axis denotes a transverse direction. The X-axis and the Y-axis can also be uniformly referred to as lateral axes. Together, the X-axis and Y-axis define a horizontal plane that is perpendicular to the Z-axis and perpendicular to the vertical plane.

It goes without saying that other assignments and designations can be used. The skilled person can easily perform the necessary conceptual transformations and associations. The same also applies to position and direction indications, such as above, below, laterally, transversely, in front, behind and the like. The coordinate system X, Y, Z is referred to repeatedly herein below for illustrative purposes.

The device 80 includes a die 82, which is designed as a multi-part die. The die 82 is coupled with a bed 84 and/or attached to the bed 84. The bed 84 can also be described as a rack or frame. The die 82 forms a cavity 86 which can be filled with a hard-metal powder to form a pressed article 10 by applying pressure.

The die 82 comprises lateral mold parts 90, 92, 94, 96. The mold parts 90, 92, 94, 96 are movable parallel to the horizontal plane. In other words, the mold parts 90, 92, 94, 96 can be moved between an open position and a closed position. For example, the mold parts 90, 94 can be moved along the X-direction. Accordingly, the mold parts 92, 96 are exemplarily movable along the Y-direction. The mold parts 90, 92, 94, 96 can be moved towards and away from each other. The mold parts 90, 92, 94, 96 are arranged in circumferentially around the central axis 14 of the pressed article 10 to be produced. The central axis 14 is parallel to the Z-direction.

The device 80 also includes a stamping unit 98, which exemplarily includes punches 100, 102, 104, 106. The punches 100, 102, 104, 106 together with the mold parts 90, 92, 94, 96 form at least a circumferential portion (reference numeral 32 in FIG. 1) of the pressed article 10 in cavity 86.

For instance, punches 100, 102, 104, 106 may be described as lateral punches or lateral punch parts. In other words, punches 100, 102, 104, 106 are not—as usual—designed to be moved parallel to and/or along the Z axis in order to act "from above" or "from below" on the powder accommodated in the cavity 86. Instead, the punches 100, 102, 104, 106 as well as the mold parts 90, 92, 94, 96 are designed to be moved parallel to the horizontal plane defined by the X-axis and the Y-axis in order to pressurize and compress the powder accommodated in the cavity 86.

In certain embodiments, the punches 100, 102, 104, 106 are movable parallel to the mold parts 90, 92, 94, 96. In this way the mold parts 90, 92, 94, 96 can serve, at least sectionally, as a guide for the punches 100, 102, 104, 106.

The stamp 100 is assigned to the mold part 90. The stamp 102 is assigned to the mold part 92. The stamp 104 is assigned to the mold part 94. The stamp 106 is assigned to the mold part 96.

In the mold part 90, a guide recess 110 for the stamp 100 is formed. In the mold part 92, a guide recess 112 is formed for the stamp 102. In the mold part 94, a guide recess 114 for the stamp 106 is formed for the stamp 104. In the mold part 96, a guide recess 116 for the stamp 106 is designed.

It is preferred, at least according to exemplary embodiments, if no other punches, for instance no vertical punches, are provided in addition to punches 100, 102, 104, 106, which are designed as lateral punches. In other words, a departure from known principles has been created, which involves that the punches can now be supplied primarily laterally to the cavity 86 to form the pressed article 10.

The cavity further comprises a lower mold part 120 and an upper mold part 122. For forming the recess 18, sliders 124, 126 are further provided. The slider 124 is assigned to the lower mold part 120. The slider 126 is assigned to the upper mold part 122. The sliders 124, 126 can also be referred to as vertical sliders. The slider 124, 126 contact each other when the cavity 86 is closed. In this way, the region in the cavity 86 that later forms the recess 18 in the pressed article 10 is blocked.

The lower mold part 120 is provided with a guide recess 128 for the slider 124. The upper mold part 122 is provided with a guide recess 130 for the slider 126.

Figure 8:
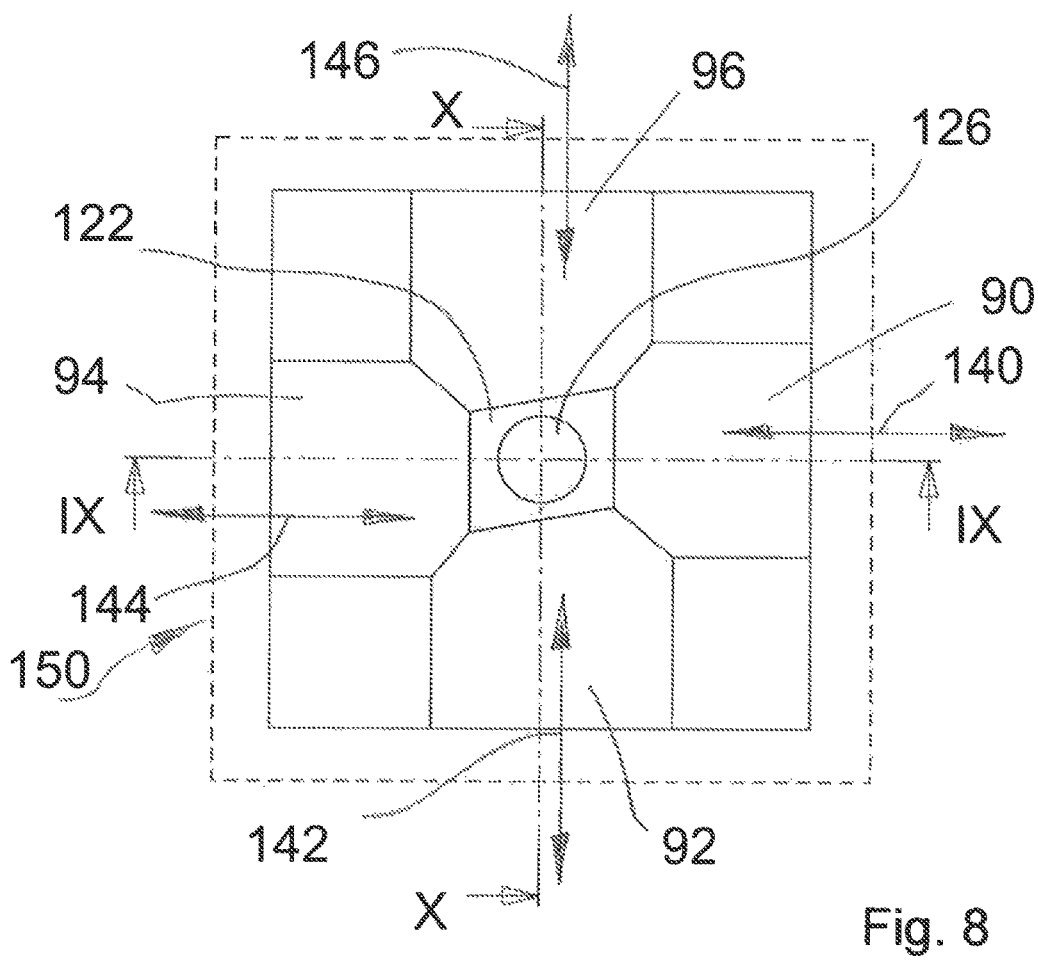
FIG. 8 is a top view of the arrangement according to FIG. 7.

In FIG. 8, the directions of movement of the mold part 90, 92, 94, 96 and the punches 100, 102, 104, 106 are indicated by arrows marked 140, 142, 144, 146. The respectively paired mold parts and punches 90, 100; 92, 102; 94, 104 and 96, 106 are each movable parallel to each other but at least partially independently of each other to define the cavity 86, to compress the metal powder accommodated in the cavity 86, and to release the resulting pressed article 10.

FIG. 8 also shows a schematically simplified holding unit 150, which is assigned to the mold parts 90, 92, 94 and 96. In addition, the holding unit 150 is also assigned to the lower mold part 120, the upper mold part 122 and, if present, the vertical sliders 124, 126. During the pressing process, the mold parts 90, 92, 94, 96, the lower mold part 120, the upper mold part 122 as well as the sliders 124, 126 are locked and/or held with high force. In other words, these components do not serve as punches.

The device 80 comprises four locking and/or holding axes for the mold part 90, 92, 94, 96. In addition, a locking and/or holding axle is provided for the lower mold part 120 and the upper mold part 122. If necessary, separate locking and holding axes are also provided for the vertical slider 124, 126. It is also conceivable to control the lower mold part 120 and the associated slider 124 as well as the upper mold part 122 and the associated slider 126 with a respective locking or holding axle.

Furthermore, the punch unit 98 of the device 80 has comprises punch axes for the punches 100, 102, 104, 106, which act laterally on the metal powder accommodated in the cavity 86.

Figure 9:
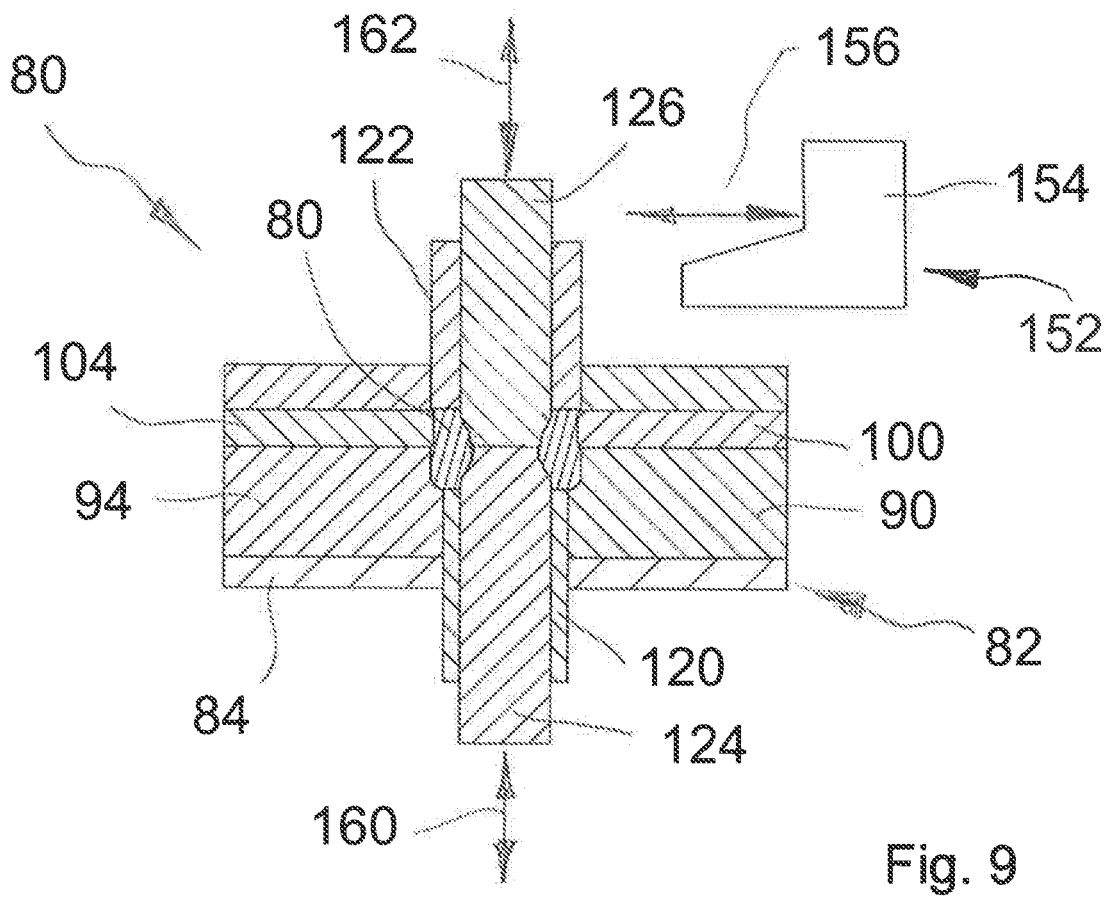
FIG. 9 is a sectional view of the arrangement according to FIG. 8 along the line IX-IX.

In FIG. 9 a filling unit is indicated by 152 in a schematic, greatly simplified form. The filling unit 152 comprises a filling shoe 154 which can be fed to an opening of the cavity 86 to fill the cavity 86 with hard-metal powder. An exemplary feed direction for the filling shoe 154 is indicated in FIG. 9 by 156. For example, the upper mold part 122 and/or the slider 126 assigned to the upper mold part 122 can first be removed from the cavity 86 in order to be able to feed the filling shoe 154 of the filling unit 152. Once the required amount of hard-metal powder has been introduced into the cavity 86, the filling shoe 154 can be removed. The upper mold part 122 and/or the slider 126 can then be moved to their closed position, so that the cavity 86 is closed and ready for the pressing procedure.

In FIG. 9, a double arrow marked by 160 indicates the direction of movement of the lower mold part 120 and/or the lower vertical slider 124. Furthermore, a double arrow labeled with 162 indicates the direction of movement of the upper mold part 122 and/or the upper vertical slider 126.

Figure 10:
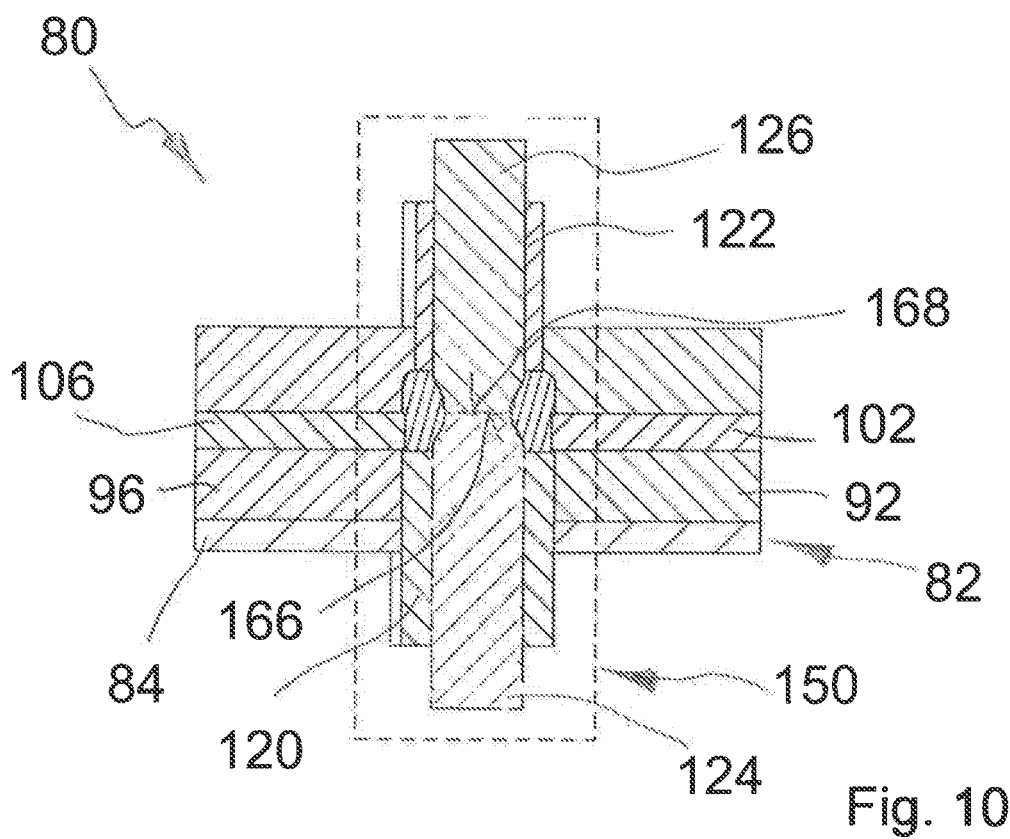
FIG. 10 is a sectional view of the arrangement according to FIG. 8 along the line X-X.
Figure 11:
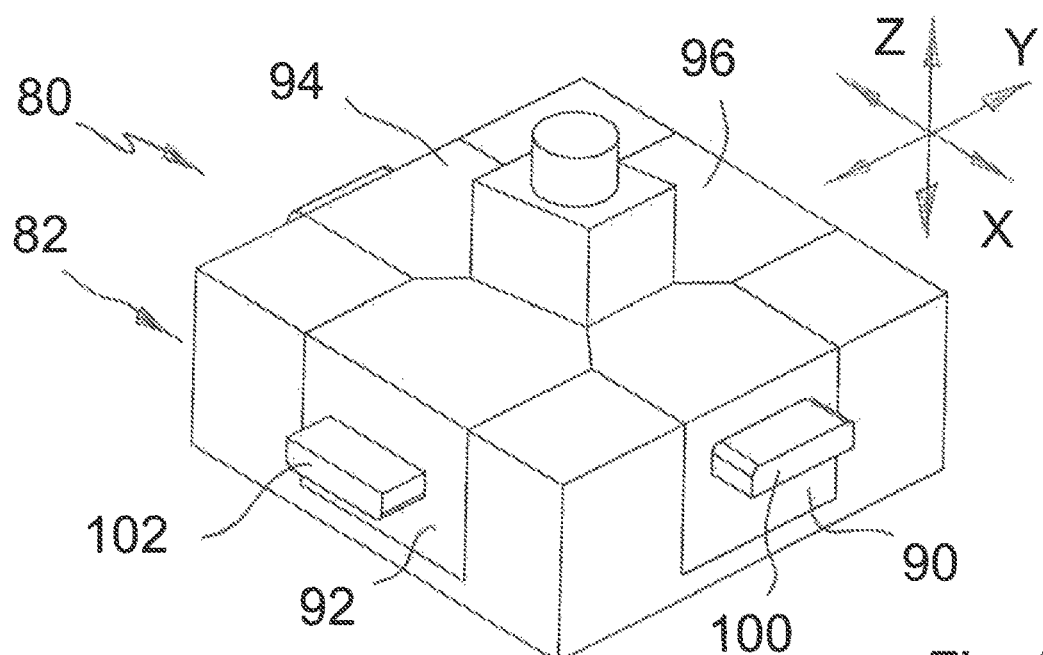
FIG. 11 is a further perspective representation of the device according to FIG. 6 in an orientation according to FIG. 7, wherein the device is in a second state.
Figure 17:
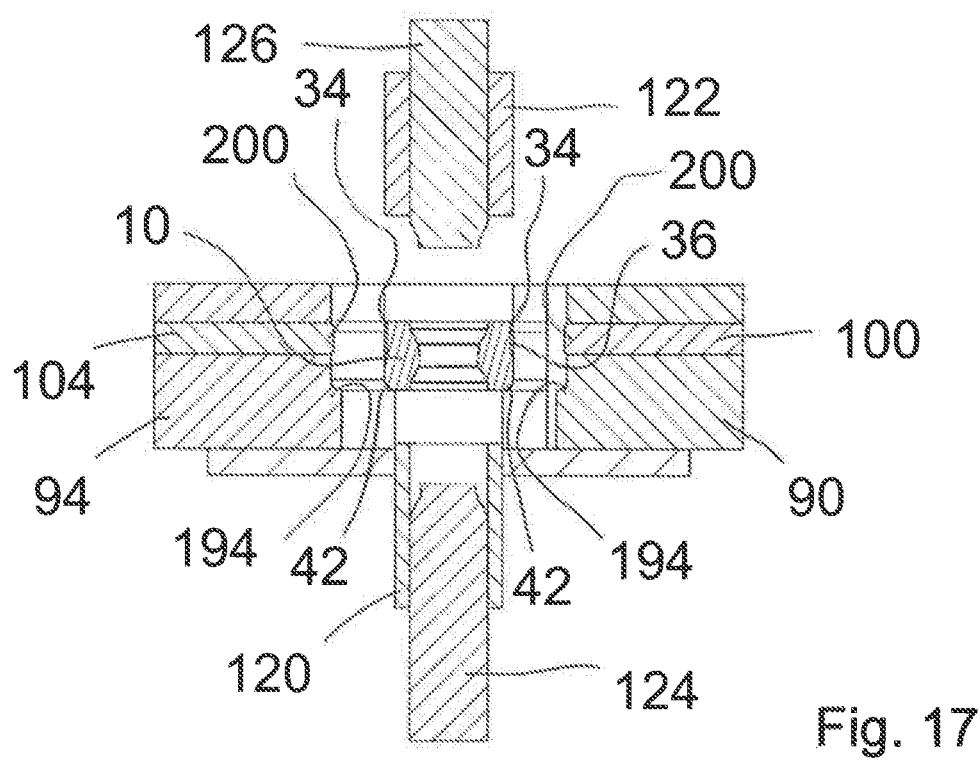
FIG. 17 is a sectional view of the arrangement according to FIG. 16 along the line XVII-XVII.
Figure 18:
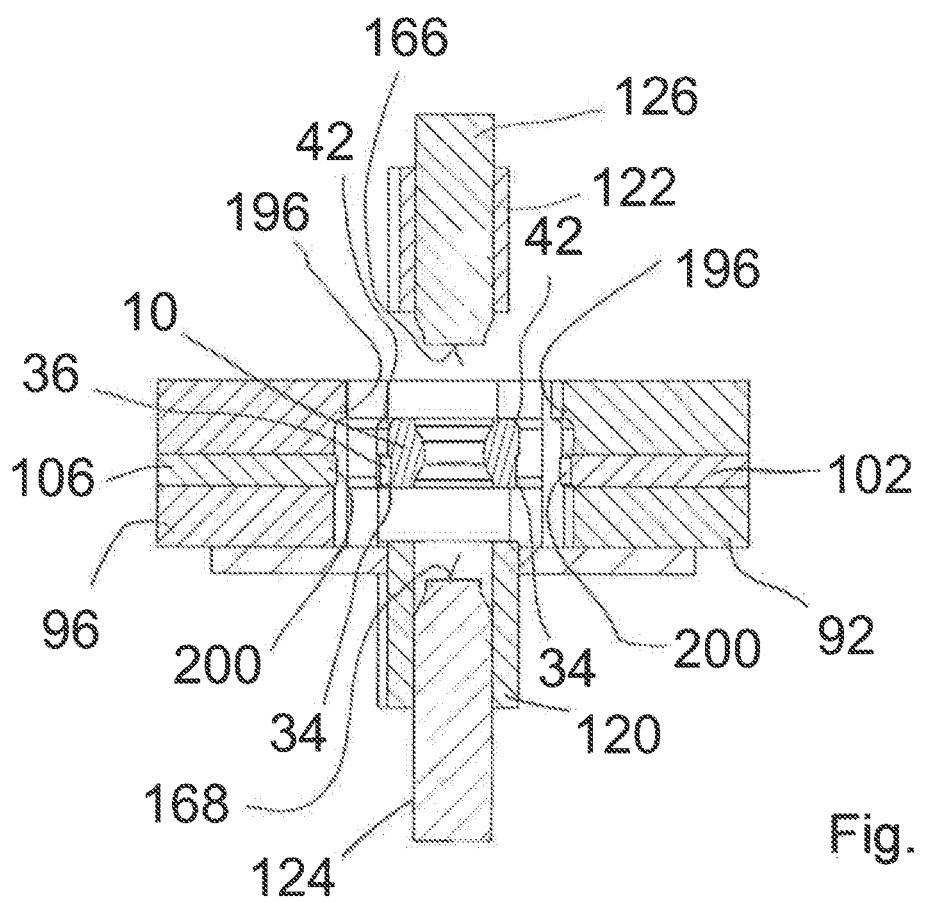
FIG. 18 is a sectional view of the arrangement according to FIG. 16 along line XVIII-XVIII.

With reference to FIGS. 9 and 10 as well as with supplementary reference to FIGS. 17 and 18 the cooperation of the vertical sliders 124, 126 is illustrated. The vertical slider 126 comprises a front surface 166. The vertical slider 124 comprises a front surface 168. The front surfaces 166, 168 are arranged to be planar, for instance. The front surfaces 166, 168 can contact each other sealingly, so that good sealing results between the vertical sliders 124, 126 in the cavity 86 to form the recess 18.

A comparison of FIGS. 9 and 10 shows that the punches 100, 104 are arranged at a different vertical level than the punches 102, 106. In other words, the punches 100, 104 are arranged higher than the punches 102, 106, in accordance with the exemplary embodiment illustrated in FIGS. 9 and 10. For explanation, reference is again made to pressed article 10 illustrated with reference to FIGS. 1 to 4, which is provided with a plurality of cutting edges 12a, 12b, 12c, 12d, wherein the cutting edges 12a and 12b are facing away from the cutting edges 12c, 12d, with respect to a central plane 20. However, since, as already indicated above, the (cutting) edges 34 of the cutting edges 12a, 12b, 12c, 12d are, in certain embodiments, defined by a separating plane of the die 82, the punches 100, 102, 104, 106 are respectively assigned to the vertical position of cutting edge 12a, 12b, 12c, 12d they have to form.

The already above-mentioned FIGS. 7 to 10 illustrate the pressing device 80 in a first state. In the state shown in FIGS. 7 to 10, the pressing device 80 is completely closed. This means that the mold parts 90, 92, 94, 96, the lower mold part 120, the upper mold part 122 and the vertical slider 124, 126 are arranged in their closed position. Further, the punches 100, 102, 104, 106 are in an end position (pressing position) in which the desired shaping and compression of the metal powder contained in the cavity 86 can be achieved.

FIGS. 11 to 14 and the FIGS. 15 to 18 each illustrate the pressing device 80 in a different operating state. The view orientation in FIGS. 11 and 15 corresponds to the orientation in FIG. 7. The view orientation in FIGS. 12 and 16 corresponds to the orientation in FIG. 8. The view orientation in FIGS. 13 and 17 corresponds to the orientation in FIG. 9. The view orientation in FIGS. 14 and 18 corresponds to the orientation in FIG. 10.

FIGS. 11 to 14 illustrate a state in which the die parts, i.e. essentially the mold parts, are arranged in their closed position. The mold parts are those parts that do not serve as punch parts. The mold parts comprise the lateral mold parts 90, 92, 94, 96, the lower mold part 120, the upper mold part 122 and, if present, the vertical sliders 124, 126.

The mold parts define the portion of the cavity 86 that is not moved during the actual pressing process. Thus, for instance, the sectional views shown in FIGS. 13 and 14 illustrate the cavity in a filling position for receiving the unpressed metal powder, wherein for illustrative reasons the metal powder is not shown. The view orientation in FIG. 13 follows the line XIII-XIII in FIG. 12. The view orientation in FIG. 14 follows the line XIV-XIV in FIG. 12.

Figure 12:
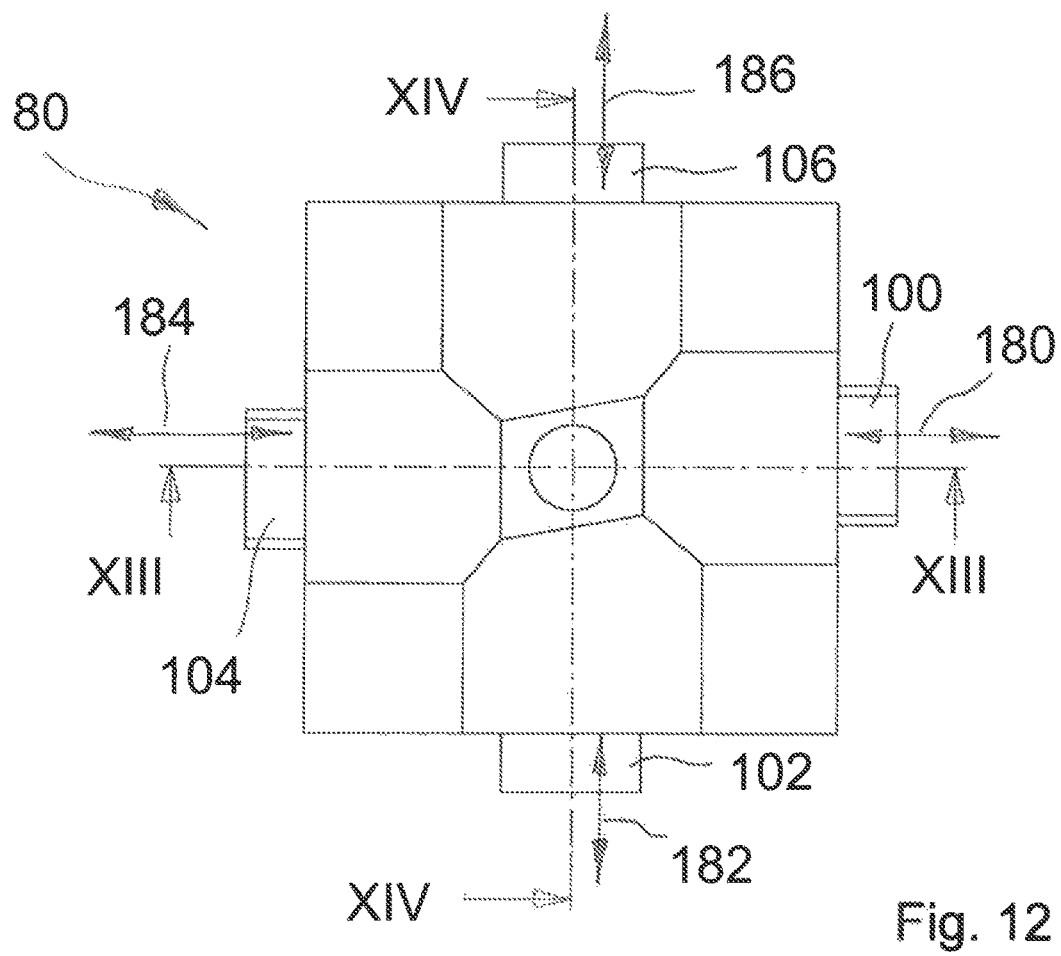
FIG. 12 is a top view of the arrangement according to FIG. 11.

In FIG. 12, the double arrows 180, 182, 184, 186 indicate a pressing direction or pressing axis of the punches 100, 102, 104, 106. The punches 100, 104 can be moved parallel to the X-axis. The punches 102, 106 can be moved parallel to the Y-axis. The compression of the hard-metal powder, which is introduced into the cavity 86 by the filling unit 152 (FIG. 9), is compresses and shapes the hard-metal powder in the desired manner by the movement of the punches 100, 102, 104, 106.

Again referring to FIGS. 13 and 14, the design of the cavity 86 is illustrated in more detail. A lower side 190 (FIG. 14) of the cavity 86 is formed at least partially by the lower mold part 120 and, if any, the vertical slider 124. An upper side 192 (FIG. 13) is defined at least in part by the upper mold part 122 and, if any, by the slider 126.

In the pressed article 10, the lower side 190 and the upper side 192 essentially correspond to the lower base area 30 and the upper base area 28.

As already explained above, transitions 42 are formed on the pressed article 10 between the base areas 28, 30 and the circumferential portion 32. The transitions 42 on the (four) sides of the circumferential portion 32 are each assigned to the base area 28, 30, to which no cutting edge 12 is assigned. The transitions 42 are at least partially provided with radii and/or chamfers. For instance, chamfers, radii with tangential runouts and similar contours on the pressed article 10 are defined in the die 82 by mold parts, in certain embodiments, which do not have to comprise an excessive tapering for this purpose.

In this context, reference is made to a lower protrusion of the mold part 94 which is denoted by 194 in FIG. 13 and to an upper protrusion of the mold part 96 which is denoted by 196 in FIG. 14.

The protrusions 194, 196 each form a sub-portion at the periphery of the lower side 190 and/or upper side 192 of the cavity 86. Hence, the protrusions 194, 196 of the pressed article 10 and able transitions 42 with radii, chamfers, tangential transitions and the like.

In this context, it should be noted that the lateral mold parts 90, 92, 94, 96 provided with the corresponding protrusions 194, 196 to form the transitions 42 are, in certain embodiments, not coupled with a vertically effective stamp. If, for example, the lower mold part 120 and/or the upper mold part 122 in the embodiment illustrated in FIGS. 13 and 14 were designed as active dies, an unfavorable pressure curve and/or microstructure would result during pressing. The areas of the cavity 86 defined by protrusions 194, 196 would be positioned outside the effective range of such vertical punches. This would result in that just the transitions 42 of pressed article 10 would not have sufficient strength. In the pressed article 10 there would result an unfavorable and/or unsteady microstructure.

In this context, it is noted that it is advantageous that the punches 100, 104 and 102, 106 are arranged on different vertical planes. The vertical offset between the pairs of punches 100, 104 and 102, 106 opposite each other allows uniform compression of the hard-metal powder. In other words, the powder, which is arranged in the cavity 86 in the region of the lower protrusions 194 of the mold parts 90, 94, is compressed by the punches 102, 106. Further, the powder, which is arranged in the portion of the upper protrusions 196 of the mold parts 92, 96, is compressed by the punches 100, 104. The punches 100, 104 and 102, 106 form crossing but spaced-apart pairs of press axes 180, 184 and 182, 186.

In addition, reference is made to the state of pressing device 80 as illustrated with reference to FIGS. 15 to 18. In FIGS. 15 to 18, the cavity 86 is open so that pressed article 10 can be removed. For illustrative purposes, the pressed article 10 in FIGS. 15 to 18 is shown in a "floating state", i.e. in the position and orientation originally defined by the cavity 86 in the closed state.

The perspective illustration shown in FIG. 15 shows, by way of example, a cutting edge 12 in the pressed article 10, which is assigned to the (upper) base area 28, wherein the cutting edge 12 is formed at least partially by the punch 100, which interacts with the mold part 90. Furthermore, in FIG. 15, 42 indicates a transition between the base area 28 and a circumferential portion 32 of the pressed article 10, which is formed by a protrusion 196 in mold part 92, cf. FIG. 18.

Figure 16:
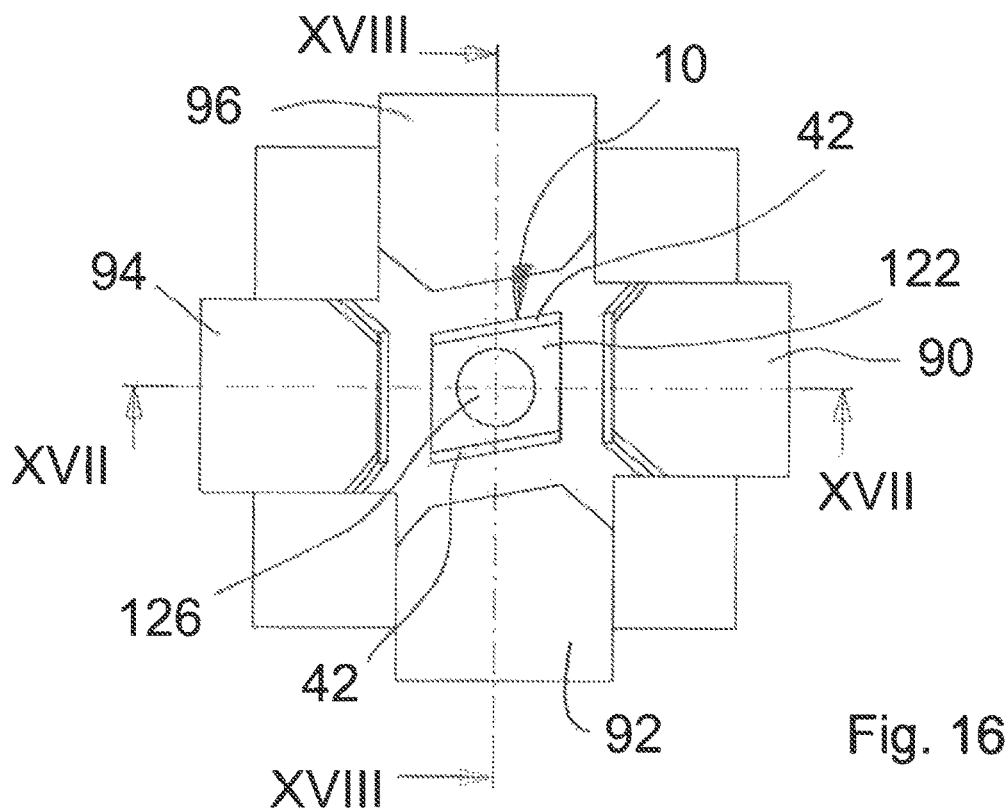
FIG. 16 is a top view of the arrangement according to FIG. 15.

The top view illustrated in FIG. 16 shows that the upper mold part 122, which is arranged in front of the pressed article 10 from the observer's point of view, does not completely cover the pressed article 10. The transitions 42, which are not formed by the upper mold part 122, are visible under the upper mold part 122.

With reference to FIGS. 7 to 18, it can be seen that in the exemplary embodiment illustrated, the cavity 86 is formed entirely by moving parts, which are punch parts and mold parts.

FIGS. 17 and 18 show frontal forming sections 200 of the punches 100, 102, 104, 106, which are each assigned to a cutting edge 12 of the pressed article 10. The forming sections 200 are formed as projections or protrusions at the respective front ends of the punches 100, 102, 104, 106, which are facing the center of the cavity 86. The forming sections 200 each form the trough-like rake face 36 of the cutting edge 12. At the transition between the forming sections 200 of the punches 100, 102, 104, 106 and the mold parts 90, 92, 94, 96 assigned thereto, the (cutting) edge 34 is formed in the resulting pressed article 10.

The cross-section shown in FIG. 17 shows upper (cutting) edges 34 assigned to the upper base area 28 of the pressed article. The section shown in FIG. 18 shows lower (cutting) edges 34 assigned to the lower base area 30 of the pressed article 10. The relief faces 38 assigned to the respective cutting edges 12 (see FIG. 1 to FIG. 4) can be defined by the lower mold part 120 and the upper mold part 122. The relief faces 38 generally have only a slight inclination in relation to the horizontal plane, so that the corresponding shape can be achieved for the lower mold part 120 and upper mold part 122 without excessive reduction in wall thickness and/or without excessively pointed runouts.

It is essential for the manufacture of the pressed article 10 in the pressing device 80 that vertical press axes can be dispensed with. The main press axes are lateral or horizontal press axes 180, 182, 184, 186, cf. FIG. 12. In this way, the specific symmetrical design of the pressed article 10 can be produced at least near-net-shape by hard-metal pressing. This allows a significant reduction of the post-processing effort.

The concept illustrated with reference to FIGS. 6 to 18 allows greater freedom of design and allows the design of the pressed articles 10 and the cutting inserts 66 (FIG. 5) based thereon to be adapted to the intended use.

Figure 19:
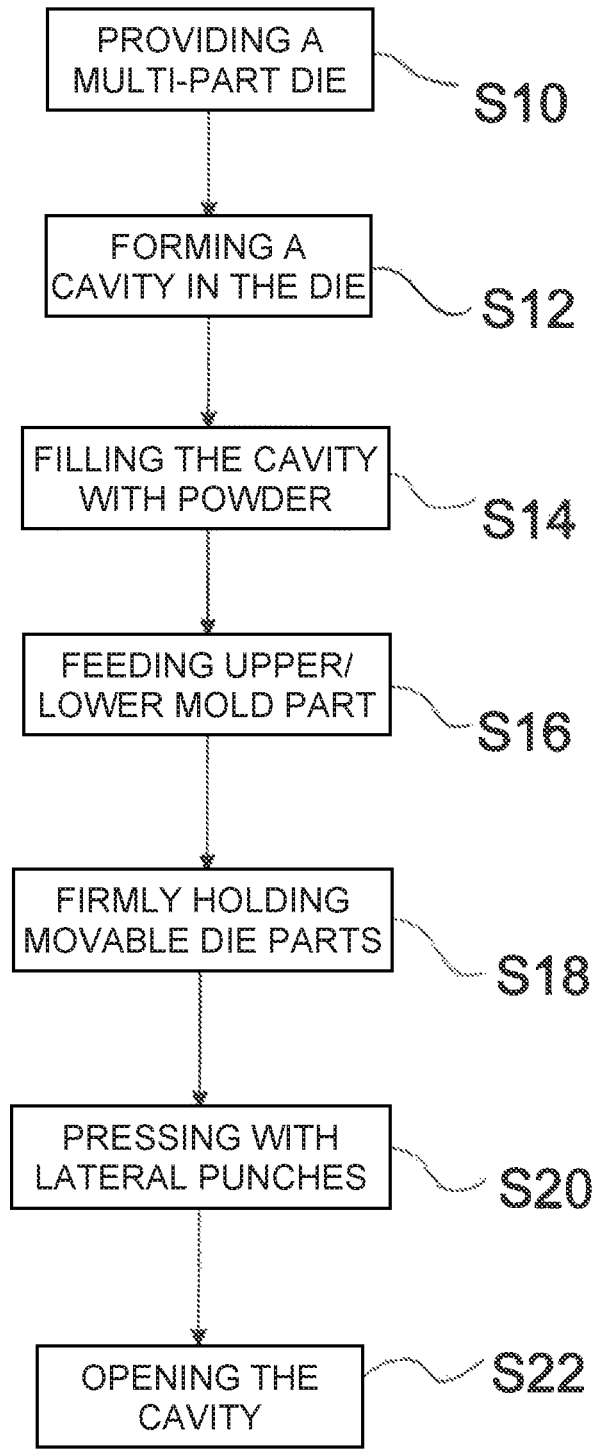
FIG. 19 is a schematic block diagram illustrating an exemplary embodiment of a method for the manufacture of hard-metal pressed articles.

With reference to FIG. 19, a schematic block diagram illustrates an exemplary embodiment of a process for the manufacture of hard-metal pressed articles. The pressed articles that can be produced according to the process can be used for the manufacture of cutting inserts, for instance for the manufacture of indexable inserts with complex geometries. In certain embodiments, the process allows the manufacture of pressed articles with low post-processing effort, for instance with low machining effort.

The method includes a step S10, which involves the provision of a multi-part die. This is followed by a step indicated by S12, which at least partially forms a cavity in the die. In certain embodiments, the cavity is formed by a plurality of movable mold parts. For instance, the step S12 may include a feeding of several mold parts and possibly a lower mold part. After the step S12, the cavity is not yet completely closed.

This is followed by a step S14, which comprises filling the cavity with a hard-metal powder. This can be done, for instance, with a filling shoe, which can be fed from above to an opening of the cavity. In this way, the hard-metal powder can trickle into the cavity with the aid of gravity. When the cavity is sufficiently filled, the filling shoe is moved away from the opening of the cavity.

This is followed by step S16, which comprises closing the cavity by feeding an upper mold part. It can be advantageous if the lateral punches move a bit outwards when the cavity is closed by the upper mold part. This supports the filling of the cavity in the direction of the lateral (horizontal) parts of the cavity. The retraction of the lateral punches can generate a vacuum, which leads to a suction effect and/or anti-cavitation effect.

The upper mold part, the lower mold part and the lateral mold parts define a large part of the cavity. Steps S12 and S16 may also include feeding of sliders, especially vertical sliders. In certain embodiments, the sliders are coupled with the lower mold part and/or the upper mold part. The slider can be used to define drill holes and/or recesses in the resulting pressed article.

A further step S18 includes firmly holding movable die parts. In certain embodiments, the mold parts, the lower mold part, the upper mold part and, if available, the sliders can be locked positively and/or force-fitted in order to withstand the pressing pressures and to produce the pressed article with the desired accuracy.

A step denoted by S20 describes the actual pressing process. The compression of the hard-metal powder is primarily effected by the lateral punches. The lateral punches can be supplied laterally to the cavity to compress the powder. In certain embodiments, the lateral punches are coupled with the lateral mold parts. This may involve, for example, common guide faces and/or guide recesses. In other words, by way of example, at least some of the lateral mold parts can provide a guide for a respective lateral slider. In this way, the die can be designed to be considerably compact, in certain embodiments.

A step S22 follows the pressing step S20, which involves opening the cavity. The lateral punches and the movable die parts, including vertically movable tool parts (e.g. upper mold part and/or lower mold part with sliders), if any, are moved to an open position to allow removal of the pressed article.

Further steps can follow, for instance a post-processing step and/or a handling step. In this way, the pressed article can be brought into the desired shape. The pressed article can be transferred to a sintering plant in order to produce a cutting tool, for instance a cutting insert or a cutting plate, on the basis of the pressed article by sintering.

What is claimed is:

1. A method for the near-net-shape manufacture of hard-metal pressed articles, the method comprising:
    providing a multi-part die comprising a plurality of lateral mold parts defining lateral surfaces of a cavity for a pressed article, wherein the multi-part die is arranged on a bed,
    wherein at least one of the plurality of lateral mold parts further defines a portion of an upper side of the cavity,
    feeding the lateral mold parts along a first plane, wherein the first plane is a horizontal plane,
    feeding at least two lateral punch parts along the first plane,
    wherein at least two of the plurality of lateral mold parts are provided with a guide recess for one of the at least two lateral punch parts, which is movable along the guide recess,
    feeding a filling unit above an opening of the cavity, and gravity-supported filling the cavity with a hard-metal powder,
    feeding at least one upper mold part, which defines a portion of the upper side of the cavity, including moving the at least one upper mold part along a second plane, wherein the second plane is a vertical plane,
    holding the lateral mold parts and the upper mold part to form the cavity,
    compressing the powder with at least two lateral punch parts, and
    opening the lateral mold parts, the upper mold part and the punch parts for demolding the pressed article.

2. The method as claimed in claim 1, further comprising:
    providing at least one of the plurality of lateral mold parts, which further defines a portion of a lower side of the cavity,
    feeding at least one lower mold part, which defines a portion of a lower side of the cavity, and
    holding the lower mold part together with the holding of the lateral mold parts and the upper mold part.

3. The method as claimed in claim 2, wherein the lateral mold parts, the upper mold part and the lower mold part are fixed during compression, and wherein the lateral punch parts are moved for compressing the powder.

4. The method as claimed in claim 1, wherein the step of compressing the powder comprises a lateral compression by the punch parts.

5. The method as claimed in claim 2, wherein the lateral mold parts and the punch parts are movable parallel to the first plane and wherein at least one of the upper mold part and the lower mold part, is movable parallel to the second plane that is perpendicular to the first plane.

6. The method as claimed in claim 1, wherein the upper mold part is coupled to a vertical slider which forms a recess in the pressed article, and wherein the vertical slider is movable parallel to a movement direction of the upper mold part along the second plane.

7. The method as claimed in claim 1, wherein the step of feeding the lateral mold parts comprises feeding three or more of the plurality of lateral mold parts, which are movable toward and away from each other, to open or close the cavity.

8. The method according to claim 7, wherein the lateral mold parts together define a horizontal boundary for the pressed article.

9. The method as claimed in claim 1, wherein the cavity and a resulting shape of the pressed article are defined entirely by movable die parts and movable punch parts.

10. The method as claimed in claim 1, wherein each of the plurality of lateral mold parts is associated with a punch part that is arranged in the respective guide recess of the lateral mold part, and wherein a direction of movement of the punch part is parallel to the direction of movement of the respective lateral mold part.

11. The method as claimed in claim 1, wherein at least two punch parts are arranged opposite to one another and vertically offset from one another.

12. The method as claimed in claim 1, wherein the punch parts form portions of the shape of the pressed article, which are not vertically demoldable.

13. The method as claimed in claim 1, wherein the lateral mold parts form a transition between a circumferential portion and at least one upper or lower base area of the pressed article, and wherein the transition comprises a radius or a chamfer.

14. The method as claimed in claim 2, wherein at least one upper or lower base area of the pressed article in the cavity is formed punch-less.

15. The method as claimed in claim 2, wherein the plurality of lateral mold parts involves four mold parts, which are configured for forming a pressed article for an indexable insert of rhombic shape, which lateral mold parts define, at least sectionally, four sides of the pressed article and are coupled to four lateral punch parts which define four rake faces on four circumferential sides of the pressed article, wherein an upper mold part for forming an upper base area and a lower mold part for forming a lower base area are provided, which are coupled to an upper vertical slider and a lower vertical slider, which contact each other, and wherein the upper vertical slider and the lower vertical slider together form a through opening on the pressed article.

16. A method for the manufacture of hard-metal cutting tools, comprising the steps of:
   manufacturing a pressed article in accordance with the method as claimed in claim 1,
   parts handling with only little post-processing or without post-processing, and
   sintering the pressed articles.

* * * * *